(12) United States Patent
Ryan et al.

(10) Patent No.: US 12,373,807 B2
(45) Date of Patent: Jul. 29, 2025

(54) AUTOMATED BANKING MACHINE FIRMWARE FLOW CONTROL

(71) Applicant: Diebold Nixdorf, Incorporated, North Canton, OH (US)

(72) Inventors: Mike P. Ryan, Canton, OH (US); Andrew Clugston, Canton, OH (US); Brian Block, North Canton, OH (US); Eric Klein, Massillon, OH (US)

(73) Assignee: Diebold Nixdorf Incorporated, North Canton, OH (US)

( * ) Notice: Subject to any disclaimer, the term of this patent is extended or adjusted under 35 U.S.C. 154(b) by 134 days.

(21) Appl. No.: 17/550,364

(22) Filed: Dec. 14, 2021

(65) Prior Publication Data

US 2022/0147959 A1 May 12, 2022

Related U.S. Application Data

(63) Continuation of application No. 15/741,416, filed as application No. PCT/US2016/039509 on Jun. 27, 2016, now Pat. No. 11,200,549.

(Continued)

(51) Int. Cl.
*G06Q 20/10* (2012.01)
*B65H 43/00* (2006.01)
(Continued)

(52) U.S. Cl.
CPC ......... *G06Q 20/1085* (2013.01); *B65H 43/00* (2013.01); *G06F 16/81* (2019.01); *G06Q 20/3827* (2013.01); *G06Q 20/3829* (2013.01); *G06Q 20/4014* (2013.01); *G07D 11/00* (2013.01); *H04L 9/3242* (2013.01);
(Continued)

(58) Field of Classification Search
None
See application file for complete search history.

(56) References Cited

U.S. PATENT DOCUMENTS 5,694,128 A * 12/1997 Kim .................... H03M 7/4006
341/51
6,026,242 A * 2/2000 Chessin .................... G06F 8/54
717/162

(Continued)

OTHER PUBLICATIONS

Protocol Buffers; Wikipedia; https://en.wikipedia.org/wiki/Protocol_Buffers; assessed Nov. 29, 2021.

(Continued)

*Primary Examiner* — Dawaune A Conyers
(74) *Attorney, Agent, or Firm* — Black McCuskey

(57) ABSTRACT

Described in example embodiments herein are techniques for implementing an automated banking machine such as an ATM. An example embodiments, tracks the flow of a note through an ATM. Another embodiment corrects errors detected during a note flow. Some embodiments are in the form of security protocols for communications or other communication protocols, or techniques for monitoring devices operating in the ATM. Yet another example embodiment is directed to security of a currency cassette. Still yet another embodiment is directed to detecting tampering of the ATM's gate and/or shuttle. Yet still another embodiment determines if notes in a shuttle were delivered.

6 Claims, 24 Drawing Sheets

Related U.S. Application Data

(60) Provisional application No. 62/184,618, filed on Jun. 25, 2015.

(51) Int. Cl.
  *G06F 8/30* (2018.01)
  *G06F 16/81* (2019.01)
  *G06F 16/84* (2019.01)
  *G06F 40/205* (2020.01)
  *G06Q 20/38* (2012.01)
  *G06Q 20/40* (2012.01)
  *G07D 11/00* (2019.01)
  *G07F 19/00* (2006.01)
  *H04L 9/32* (2006.01)
  *H04L 9/40* (2022.01)

(52) U.S. Cl.
  CPC .......... *H04L 63/0435* (2013.01); *G06F 8/30* (2013.01); *G06F 16/84* (2019.01); *G06F 40/205* (2020.01); *G06Q 2220/00* (2013.01); *G07F 19/206* (2013.01)

(56) References Cited

U.S. PATENT DOCUMENTS

| | | | | |
|---|---|---|---|---|
| 2004/0103282 | A1* | 5/2004 | Meier | H04L 9/0891 |
| | | | | 713/171 |
| 2007/0113222 | A1* | 5/2007 | Dignum | G06F 40/205 |
| | | | | 715/239 |
| 2007/0143664 | A1* | 6/2007 | Fang | G06F 16/80 |
| | | | | 715/234 |
| 2015/0340075 | A1* | 11/2015 | Shiga | G06F 12/1408 |
| | | | | 713/193 |
| 2016/0077800 | A1* | 3/2016 | Zaidi | H04L 12/413 |
| | | | | 707/752 |

OTHER PUBLICATIONS

Protocol Buffer Language Guide; Wikipedia; https://developers.google.com/protocol-buffers/docs/proto3; assessed Nov. 29, 2021.
Yoshihiro Ohba, Kenichi Taniuchi and Subir Das; Integration of XML and TLV; Presented at IEEE 802.21 session in Vancouver; Jan. 9, 2006; all pages; IEEE 802.21 Media Independent Handover; internet publication at https://www.ieee802.org/21/doctree/2006_Meeting_Docs/2006-01_meeting_docs/21-06-0407-04-0000-XML-TLV-Integration.ppt.

* cited by examiner

FIG. 11 (1100)

| BYTE NAME | BYTE 0 | BYTE 1 | BYTE 2 | BYTE 3 | BYTE 4 | BYTE 5 | BYTE 6 | BYTE 7 |
|---|---|---|---|---|---|---|---|---|
| | MR0 | MR1 | MR2 | MR3 | MAC MSB19 | MAC MSB18 | MAC MSB17 | NU |

| BYTE | NAME | DESCRIPTION |
|---|---|---|
| 0 | MR0 | MAIN CCA RANDOM DATA BYTE 0 |
| 1 | MR1 | MAIN CCA RANDOM DATA BYTE 1 |
| 2 | MR2 | MAIN CCA RANDOM DATA BYTE 2 |
| 3 | MR3 | MAIN CCA RANDOM DATA BYTE 3 |
| 4 | MAC MSB19 | SHA1 BYTE 19 OF 19 OF BYTE 0:3 + KEY |
| 5 | MAC MSB18 | SHA1 BYTE 18 OF 19 OF BYTE 0:3 + KEY |
| 6 | MAC MSB17 | SHA1 BYTE 17 OF 19 OF BYTE 0:3 + KEY |
| 7 | NU | NOT USED. THIS BYTE IS NOT TRANSMITTED ON THE CAN BUS. |

FIG. 12 (1200)

| BYTE NAME | BYTE 0 | BYTE 1 | BYTE 2 | BYTE 3 | BYTE 4 | BYTE 5 | BYTE 6 | BYTE 7 |
|---|---|---|---|---|---|---|---|---|
| | PR0 | PR1 | PR2 | PR3 | MAC MSB19 | MAC MSB18 | MAC MSB17 | NU |

| BYTE | NAME | DESCRIPTION |
|---|---|---|
| 0 | PR0 | PSoC CCA RANDOM DATA BYTE 0 |
| 1 | PR1 | PSoC CCA RANDOM DATA BYTE 1 |
| 2 | PR2 | PSoC CCA RANDOM DATA BYTE 2 |
| 3 | PR3 | PSoC CCA RANDOM DATA BYTE 3 |
| 4 | MAC MSB19 | SHA1 BYTE 19 OF 19 OF BYTE 0:3 + KEY |
| 5 | MAC MSB18 | SHA1 BYTE 18 OF 19 OF BYTE 0:3 + KEY |
| 6 | MAC MSB17 | SHA1 BYTE 17 OF 19 OF BYTE 0:3 + KEY |
| 7 | NU | NOT USED. THIS BYTE IS NOT TRANSMITTED ON THE CAN BUS. |

1300

| BYTE | NAME | BYTE 0 | BYTE 1 | BYTE 2 | BYTE 3 | BYTE 4 | BYTE 5 | BYTE 6 | BYTE 7 |
|------|------|--------|--------|--------|--------|--------|--------|--------|--------|
| BYTE NAME | | MAC MSB19 | MAC MSB18 | MAC MSB17 | NU | NU | NU | NU | NU |
| 1 | MAC MSB19 | SHA1 BYTE 19 OF 19 OF PR0:3 + KEY |
| 2 | MAC MSB18 | SHA1 BYTE 18 OF 19 OF PR0:3 + KEY |
| 3 | MAC MSB17 | SHA1 BYTE 17 OF 19 OF PR0:3 + KEY |
| 4:7 | NU | NOT USED. THIS BYTE IS NOT TRANSMITTED ON THE CAN BUS. |

| BYTE | NAME | BYTE 0 | BYTE 1 | BYTE 2 | BYTE 3 | BYTE 4 | BYTE 5 | BYTE 6 | BYTE 7 |
|------|------|--------|--------|--------|--------|--------|--------|--------|--------|
| BYTE NAME | | MRS0 | MRS1 | MRS2 | MRS3 | MAC MSB19 | MAC MSB18 | MAC MSB17 | NU |
| 0 | MRS0 | MAIN CCA RANDOM SEED DATA BYTE 0 |
| 1 | MRS1 | MAIN CCA RANDOM SEED DATA BYTE 1 |
| 2 | MRS2 | MAIN CCA RANDOM SEED DATA BYTE 2 |
| 3 | MRS3 | MAIN CCA RANDOM SEED DATA BYTE 3 |
| 4 | MAC MSB19 | SHA1 BYTE 19 OF BYTE 0:3 + KEY |
| 5 | MAC MSB18 | SHA1 BYTE 18 OF BYTE 0:3 + KEY |
| 6 | MAC MSB17 | SHA1 BYTE 17 OF BYTE 0:3 + KEY |
| 7 | NU | NOT USED. THIS BYTE IS NOT TRANSMITTED ON THE CAN BUS. |

FIG. 14

SET STAIN RESPONSE

| BYTE NAME | BYTE 0 PRS0 | BYTE 1 PRS1 | BYTE 2 PRS2 | BYTE 3 PRS3 | BYTE 4 MAC MSB19 | BYTE 5 MAC MSB18 | BYTE 6 MAC MSB17 | BYTE 7 NU |
|---|---|---|---|---|---|---|---|---|
| BYTE | NAME | DESCRIPTION | | | | | | |
| 0 | PRS0 | PSoC CCA RANDOM SEED DATA BYTE 0 | | | | | | |
| 1 | PRS1 | PSoC CCA RANDOM SEED DATA BYTE 1 | | | | | | |
| 2 | PRS2 | PSoC CCA RANDOM SEED DATA BYTE 2 | | | | | | |
| 3 | PRS3 | PSoC CCA RANDOM SEED DATA BYTE 3 | | | | | | |
| 4 | MAC MSB19 | SHA1 BYTE 19 OF 19 OF BYTE 0:3 + KEY | | | | | | |
| 5 | MAC MSB18 | SHA1 BYTE 18 OF 19 OF BYTE 0:3 + KEY | | | | | | |
| 6 | MAC MSB17 | SHA1 BYTE 17 OF 19 OF BYTE 0:3 + KEY | | | | | | |
| 7 | NU | NOT USED. THIS BYTE IS NOT TRANSMITTED ON THE CAN BUS. | | | | | | |

FIG. 15

KEY SET COMMAND

| BYTE NAME | BYTE 0 MRS0 | BYTE 1 MRS1 | BYTE 2 MRS2 | BYTE 3 MRS3 | BYTE 4 MAC MSB19 | BYTE 5 MAC MSB18 | BYTE 6 MAC MSB17 | BYTE 7 NU |
|---|---|---|---|---|---|---|---|---|
| BYTE | NAME | DESCRIPTION | | | | | | |
| 0 | MRS0 | MAIN CCA RANDOM DATA SEED BYTE 0 | | | | | | |
| 1 | MRS1 | MAIN CCA RANDOM DATA SEED BYTE 1 | | | | | | |
| 2 | MRS2 | MAIN CCA RANDOM DATA SEED BYTE 2 | | | | | | |
| 3 | MRS3 | MAIN CCA RANDOM DATA SEED BYTE 3 | | | | | | |
| 4 | MAC MSB19 | SHA1 BYTE 19 OF 19 OF BYTE 0:3 + KEY | | | | | | |
| 5 | MAC MSB18 | SHA1 BYTE 18 OF 19 OF BYTE 0:3 + KEY | | | | | | |
| 6 | MAC MSB17 | SHA1 BYTE 17 OF 19 OF BYTE 0:3 + KEY | | | | | | |
| 7 | NU | NOT USED. THIS BYTE IS NOT TRANSMITTED ON THE CAN BUS. | | | | | | |

FIG. 16

KEY SET RESPONSE

| BYTE NAME | BYTE 0 | BYTE 1 | BYTE 2 | BYTE 3 | BYTE 4 | BYTE 5 | BYTE 6 | BYTE 7 |
|---|---|---|---|---|---|---|---|---|
| | PRS0 | PRS1 | PRS2 | PRS3 | MAC MSB19 | MAC MSB18 | MAC MSB17 | NU |

| BYTE | NAME | DESCRIPTION |
|---|---|---|
| 0 | PRS0 | PSoC CCA RANDOM SEED DATA BYTE 0 |
| 1 | PRS1 | PSoC CCA RANDOM SEED DATA BYTE 1 |
| 2 | PRS2 | PSoC CCA RANDOM SEED DATA BYTE 2 |
| 3 | PRS3 | PSoC CCA RANDOM SEED DATA BYTE 3 |
| 4 | MAC MSB19 | SHA1 BYTE 19 OF 19 OF BYTE 0:3 + KEY |
| 5 | MAC MSB18 | SHA1 BYTE 18 OF 19 OF BYTE 0:3 + KEY |
| 6 | MAC MSB17 | SHA1 BYTE 17 OF 19 OF BYTE 0:3 + KEY |
| 7 | NU | NOT USED. THIS BYTE IS NOT TRANSMITTED ON THE CAN BUS. |

FIG. 17

BOND

| BYTE NAME | BYTE 0 | BYTE 1 | BYTE 2 | BYTE 3 | BYTE 4 | BYTE 5 | BYTE 6 | BYTE 7 |
|---|---|---|---|---|---|---|---|---|
| | MAC MSB19 | MAC MSB18 | MAC MSB17 | NU | NU | NU | NU | NU |

| BYTE | NAME | DESCRIPTION |
|---|---|---|
| 1 | MAC MSB19 | SHA1 BYTE 19 OF 19 OF BOND MESSAGE ID + KEY |
| 2 | MAC MSB18 | SHA1 BYTE 18 OF 19 OF BOND MESSAGE ID + KEY |
| 3 | MAC MSB17 | SHA1 BYTE 17 OF 19 OF BOND MESSAGE ID + KEY |
| 4:7 | NU | NOT USED. THIS BYTE IS NOT TRANSMITTED ON THE CAN BUS. |

FIG. 18

GET APPLICATION HASH COMMANDS

| BYTE NAME | BYTE 0 | BYTE 1 | BYTE 2 | BYTE 3 | BYTE 4 | BYTE 5 | BYTE 6 | BYTE 7 |
|---|---|---|---|---|---|---|---|---|
| | MAC MSB19 | MAC MSB18 | MAC MSB17 | NU | NU | NU | NU | NU |

| BYTE | NAME | DESCRIPTION |
|---|---|---|
| 1 | MAC MSB19 | SHA1 BYTE 19 OF 19 OF GET APP MESSAGE ID + STAIN |
| 2 | MAC MSB18 | SHA1 BYTE 18 OF 19 OF GET APP MESSAGE ID + STAIN |
| 3 | MAC MSB17 | SHA1 BYTE 17 OF 19 OF GET APP MESSAGE ID + STAIN |
| 4:7 | NU | NOT USED. THIS BYTE IS NOT TRANSMITTED ON THE CAN BUS. |

FIG. 19

GET APP HASH 3

| BYTE NAME | BYTE 0 | BYTE 1 | BYTE 2 | BYTE 3 | BYTE 4 | BYTE 5 | BYTE 6 | BYTE 7 |
|---|---|---|---|---|---|---|---|---|
| | APP HASH MSB19 | APP HASH MSB18 | APP HASH MSB17 | APP HASH MSB16 | APP HASH MSB15 | MAC MSB19 | MAC MSB18 | MAC MSB17 |

| BYTE | NAME | DESCRIPTION |
|---|---|---|
| 0 | APP HASH MSB19 | SHA1 BYTE 19 OF 19 OF THE APPLICATIONS FLASH |
| 1 | APP HASH MSB18 | SHA1 BYTE 18 OF 19 OF THE APPLICATIONS FLASH |
| 2 | APP HASH MSB17 | SHA1 BYTE 17 OF 19 OF THE APPLICATIONS FLASH |
| 3 | APP HASH MSB16 | SHA1 BYTE 16 OF 19 OF THE APPLICATIONS FLASH |
| 4 | APP HASH MSB15 | SHA1 BYTE 15 OF 19 OF THE APPLICATIONS FLASH |
| 5 | MAC MSB19 | SHA1 BYTE 19 OF 19 OF GET APP HASH 3 MESSAGE ID + BYTE 0:4 + STAIN |
| 6 | MAC MSB18 | SHA1 BYTE 18 OF 19 OF GET APP HASH 3 MESSAGE ID + BYTE 0:4 + STAIN |
| 7 | MAC MSB17 | SHA1 BYTE 17 OF 19 OF GET APP HASH 3 MESSAGE ID + BYTE 0:4 + STAIN |

FIG. 20

GET APP HASH 2

2100

| BYTE NAME | BYTE 0<br>APP HASH<br>MSB14 | BYTE 1<br>APP HASH<br>MSB13 | BYTE 2<br>APP HASH<br>MSB12 | BYTE 3<br>APP HASH<br>MSB11 | BYTE 4<br>APP HASH<br>MSB10 | BYTE 5<br>MAC MSB19 | BYTE 6<br>MAC MSB18 | BYTE 7<br>MAC MSB17 |
|---|---|---|---|---|---|---|---|---|

| BYTE | NAME | DESCRIPTION |
|---|---|---|
| 0 | APP HASH MSB14 | SHA1 BYTE 14 OF 19 OF THE APPLICATIONS FLASH |
| 1 | APP HASH MSB13 | SHA1 BYTE 13 OF 19 OF THE APPLICATIONS FLASH |
| 2 | APP HASH MSB12 | SHA1 BYTE 12 OF 19 OF THE APPLICATIONS FLASH |
| 3 | APP HASH MSB11 | SHA1 BYTE 11 OF 19 OF THE APPLICATIONS FLASH |
| 4 | APP HASH MSB10 | SHA1 BYTE 10 OF 19 OF THE APPLICATIONS FLASH |
| 5 | MAC MSB19 | SHA1 BYTE 19 OF GET APP HASH 2 MESSAGE ID + BYTE 0:4 + STAIN |
| 6 | MAC MSB18 | SHA1 BYTE 18 OF GET APP HASH 2 MESSAGE ID + BYTE 0:4 + STAIN |
| 7 | MAC MSB17 | SHA1 BYTE 17 OF GET APP HASH 2 MESSAGE ID + BYTE 0:4 + STAIN |

FIG. 21

GET APP HASH 1

2200

| BYTE NAME | BYTE 0<br>APP HASH<br>MSB09 | BYTE 1<br>APP HASH<br>MSB08 | BYTE 2<br>APP HASH<br>MSB07 | BYTE 3<br>APP HASH<br>MSB06 | BYTE 4<br>APP HASH<br>MSB05 | BYTE 5<br>MAC MSB19 | BYTE 6<br>MAC MSB18 | BYTE 7<br>MAC MSB17 |
|---|---|---|---|---|---|---|---|---|

| BYTE | NAME | DESCRIPTION |
|---|---|---|
| 0 | APP HASH MSB09 | SHA1 BYTE 09 OF 19 OF THE APPLICATIONS FLASH |
| 1 | APP HASH MSB08 | SHA1 BYTE 08 OF 19 OF THE APPLICATIONS FLASH |
| 2 | APP HASH MSB07 | SHA1 BYTE 07 OF 19 OF THE APPLICATIONS FLASH |
| 3 | APP HASH MSB06 | SHA1 BYTE 06 OF 19 OF THE APPLICATIONS FLASH |
| 4 | APP HASH MSB05 | SHA1 BYTE 05 OF 19 OF THE APPLICATIONS FLASH |
| 5 | MAC MSB19 | SHA1 BYTE 19 OF GET APP HASH 1 MESSAGE ID + BYTE 0:4 + STAIN |
| 6 | MAC MSB18 | SHA1 BYTE 18 OF GET APP HASH 1 MESSAGE ID + BYTE 0:4 + STAIN |
| 7 | MAC MSB17 | SHA1 BYTE 17 OF GET APP HASH 1 MESSAGE ID + BYTE 0:4 + STAIN |

GET APP HASH 0

| BYTE NAME | BYTE 0 APP HASH MSB04 | BYTE 1 APP HASH MSB03 | BYTE 2 APP HASH MSB02 | BYTE 3 APP HASH MSB01 | BYTE 4 APP HASH MSB00 | BYTE 5 MAC MSB19 | BYTE 6 MAC MSB18 | BYTE 7 MAC MSB17 |
|---|---|---|---|---|---|---|---|---|
| BYTE | NAME | | DESCRIPTION | | | | | |
| 0 | APP HASH MSB04 | | SHA1 BYTE 04 OF 19 OF THE APPLICATIONS FLASH | | | | | |
| 1 | APP HASH MSB03 | | SHA1 BYTE 03 OF 19 OF THE APPLICATIONS FLASH | | | | | |
| 2 | APP HASH MSB02 | | SHA1 BYTE 02 OF 19 OF THE APPLICATIONS FLASH | | | | | |
| 3 | APP HASH MSB01 | | SHA1 BYTE 01 OF 19 OF THE APPLICATIONS FLASH | | | | | |
| 4 | APP HASH MSB00 | | SHA1 BYTE 00 OF 19 OF THE APPLICATIONS FLASH | | | | | |
| 5 | MAC MSB19 | | SHA1 BYTE 19 OF 19 OF GET APP HASH 0 MESSAGE ID + BYTE 0:4 + STAIN | | | | | |
| 6 | MAC MSB18 | | SHA1 BYTE 18 OF 19 OF GET APP HASH 0 MESSAGE ID + BYTE 0:4 + STAIN | | | | | |
| 7 | MAC MSB17 | | SHA1 BYTE 17 OF 19 OF GET APP HASH 0 MESSAGE ID + BYTE 0:4 + STAIN | | | | | |

RUN APPLICATION COMMANDS
ONCE THE MAIN DETERMINES THE APPLICATION IS VALID, THE MAIN USES THIS COMMAND TO INSTRUCT THE BL TO JUMP TO ITS APPLICATION. THERE IS NO RESPONSE TO THIS COMMAND AS THE APPLICATION IS NEXT TO RUN.

| BYTE NAME | BYTE 0 MAC MSB19 | BYTE 1 MAC MSB18 | BYTE 2 MAC MSB17 | BYTE 3 NU | BYTE 4 NU | BYTE 5 NU | BYTE 6 NU | BYTE 7 NU |
|---|---|---|---|---|---|---|---|---|
| BYTE | NAME | | DESCRIPTION | | | | | |
| 1 | MAC MSB19 | | SHA1 BYTE 19 OF 19 OF GET APP MESSAGE ID + STAIN | | | | | |
| 2 | MAC MSB18 | | SHA1 BYTE 18 OF 19 OF GET APP MESSAGE ID + STAIN | | | | | |
| 3 | MAC MSB17 | | SHA1 BYTE 17 OF 19 OF GET APP MESSAGE ID + STAIN | | | | | |
| 4:7 | NU | | NOT USED. THIS BYTE IS NOT TRANSMITTED ON THE CAN BUS. | | | | | |

FIG. 24

AUTOMATED BANKING MACHINE FIRMWARE FLOW CONTROL

CROSS REFERENCE TO RELATED APPLICATIONS

This application is a continuation of U.S. patent application Ser. No. 15/741,416, now U.S. Pat. No. 11,200,549, that claims priority under 35 U.S.C. § 371 to PCT Patent Application PCT/US16/039509 filed Jun. 27, 2016 that claims the benefit of Provisional Application No. 62/184,618 filed Jun. 25, 2015. The entire contents of the aforementioned applications are hereby incorporated by reference.

TECHNICAL FIELD

The present disclosure relates generally to functions performed by firmware of an automated banking machine such as an Automated Teller Machine ("ATM").

BACKGROUND

A common type of self service automated banking machine used by consumers is an automated teller machine (ATM) which enables customers to carry out banking transactions. Banking transactions carried out may include the dispensing of cash, the making of deposits, and/or the transfer of funds between accounts and account balance inquiries. The types of banking transactions a consumer can carry out are determined by the capabilities of the particular banking machine.

BRIEF DESCRIPTION OF THE DRAWINGS

The accompanying drawings incorporated herein and forming a part of the specification illustrate the example embodiments.

FIGS. 11-13 illustrate an example of message formats for a sequence of messages that allows a node to validate another node a CAN bus.

FIGS. 14 and 15 illustrate an example of message formats for a sequence of messages to set a stain between two nodes on a CAN bus.

FIGS. 16-18 illustrate example message formats for a sequence of messages to bond two nodes on a CAN bus with a symmetric key.

FIGS. 19-23 illustrate message formats for a sequence of messages employed to validate loaded firmware.

FIG. 24 is an example message format for a run application command on a CAN bus employing a secure communication protocol.

OVERVIEW OF EXAMPLE EMBODIMENTS

Figure 1:
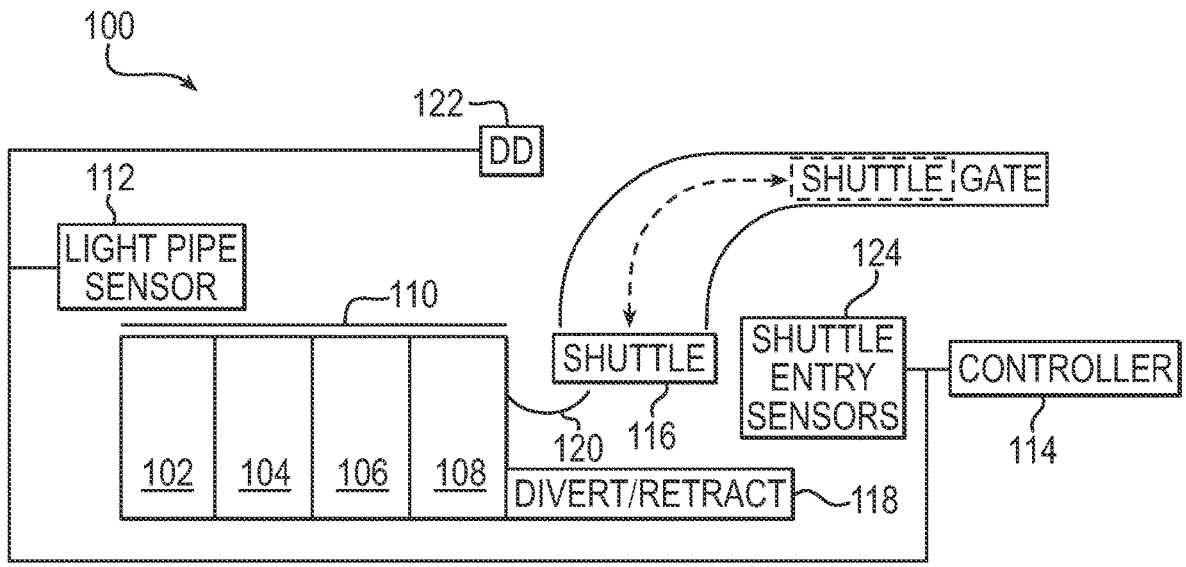
FIG. 1 is simplified block diagram illustrating an example of a portion of an automated banking machine for delivering cash from a cassette to a user external to the automated banking machine through a gate.

The following presents a simplified overview of the example embodiments in order to provide a basic understanding of some aspects of the example embodiments. This overview is not an extensive overview of the example embodiments. It is intended to neither identify key or critical elements of the example embodiments nor delineate the scope of the appended claims. Its sole purpose is to present some concepts of the example embodiments in a simplified form as a prelude to the more detailed description that is presented later.

In accordance with an example embodiment, there is disclosed herein an automated banking comprising a cassette for storing currency notes, a shuttle, a transport path for conveying currency notes from the cassette into the shuttle, a light pipe sensor operable to detect currency notes withdrawn from the cassette, a double detector at an end of the transport path adjacent to the shuttle, a plurality of shuttle entry sensors operable to detect notes entering the shuttle, a divert/retract cassette, a shuttle entry gate operable to selectively direct notes to the shuttle or the divert/retract cassette, and a controller that is operable to control the shuttle entry gate, the controller is coupled with the light pipe, the double detector, and the plurality of shuttle entry sensors. The controller is operable to operate the shuttle entry gate based on signals received from the light pipe, the double detector, and the plurality of shuttle entry sensors.

In accordance with an example embodiment, there is disclosed herein a computer implemented method that comprises tracking a note flow and determining whether an error was detected. If an error was detected, a solution is determined based on the detected error. The determined solution is then implemented. Error conditions detected include, but are not limited to, double notes detected, an overly skewed note, a curled note, a folded note, a gap between notes being too small, a missing note, a stalled note, and a count mismatch. Available solutions include, but are not limited to starting and stopping a transport path, moving the transport backward a short distance, dumping a shuttle, and sending a chaser note.

In accordance with an example embodiment, there is disclosed herein a computer implemented method for secure communications comprising generating a command identification and data. The command identification (ID) and data are hashed. A subset of the hash is employed as a message authentication code (MAC). A checksum is generated for the command ID, data, and MAC.

In accordance with an example embodiment, there is disclosed herein a computer implemented method of secure communication on an insecure bus such as a Controller Area Network ("CAN") bus.

In accordance with an example embodiment, there is disclosed herein a technique for detecting tampering at the gate of an automated banking machine.

In accordance with an example embodiment, there is disclosed herein a technique for detecting tampering of a shuttle of an automated banking machine.

In accordance with an example embodiment, there is disclosed herein a technique for detecting currency notes that were not taken by a customer.

In accordance with an example embodiment, there is disclosed herein, a lower cassette security system.

In accordance with an example embodiment, there is disclosed herein a lightweight ATM bus architecture.

DESCRIPTION OF EXAMPLE EMBODIMENTS

This description provides examples not intended to limit the scope of the appended claims. The figures generally indicate the features of the examples, where it is understood and appreciated that like reference numerals are used to refer to like elements. Reference in the specification to "one embodiment" or "an embodiment" or "an example embodiment" means that a particular feature, structure, or characteristic described is included in at least one embodiment described herein and does not imply that the feature, structure, or characteristic is present in all embodiments described herein.

FIG. 1 is simplified block diagram illustrating an example of a portion of an automated banking machine 100 for delivering cash from a cassette to a user external to the automated banking machine through a gate. The illustrated example shows four cassettes 102, 104, 106, 108, however those skilled in the art should readily appreciate that an automated banking machine may employ any physical realizable number of cassettes. In an example embodiment, cassettes 102, 104, 106, and 108 may contain currency notes of different denominations (e.g., cassette 102 may contain $1.00 bills, cassette 104 may contain $10.00 bills, cassette 106 may contain $20.00 bills, and cassette 108 may contain $50.00 bills. In other embodiments, multiple cassettes may contain the same denomination (for example cassettes 106 and 108 may both contain $20 bills). During a cash withdrawal transaction, currency notes are obtained from one or more of cassettes 102, 104, 106, 108 depending on the amount of transaction, and in particular embodiments, depending upon the denominations selected by the user.

As a currency note moves from one of cassettes 102, 104, 106, or 108, to the transport path 110, a light pipe sensor 112 detects the note transitioning from the cassette to the transport path 110. The light pipe sensor 112 is coupled with a controller 114 with logic for performing the functionality described herein. "Logic", as used herein, includes but is not limited to hardware, firmware, software and/or combinations of each to perform a function(s) or an action(s), and/or to cause a function or action from another component. For example, based on a desired application or need, logic may include a software controlled microprocessor, discrete logic such as an application specific integrated circuit (ASIC), a programmable/programmed logic device, memory device containing instructions, or the like, or combinational logic embodied in hardware. Logic may also be fully embodied as software that performs the desired functionality when executed by a processor. In an example embodiment, the controller 114 is operable to track the progress of notes withdrawn from a cassette to their arrival at the shuttle 116, or to the divert/retract cassette 118. Based on the signals sent from light pipe sensor 112, controller is operable to determine how many notes exited a cassette, whether the gap between notes is sufficient for entry into the shuttle 116, how much, if any, the notes are skewed, and determine potential double notes (e.g., if the amount of time taken to remove a note from the cassette takes too long the possibility exists that multiple notes were withdrawn from the cassette). If the controller 114 determines there is a problem with a note, or notes, withdrawn from a cassette (for example too many notes were withdrawn), the controller employs divert gate 120 to divert the notes to the divert/retract cassette 118 instead of allowing the notes to pass to the shuttle 116. New notes can be picked from the cassette to replace notes diverted to the divert/retract cassette 118. The divert/retract cassette 118 contains notes that have been diverted from the shuttle 116, notes that have been retracted from the shuttle 116 (e.g., presented to a customer who did not take the notes), or both.

An example of a light system suitable for implementing light pipe sensor 112 is disclosed in commonly owned U.S. patent application Ser. No. 15/184,063, the contents of which are hereby incorporated by reference. In an example embodiment, a light is emitted that is guided by light pipes and passes between the cassettes 102,104, 106, 108 and the transport path 110. In another example embodiment, a focused light beam (e.g., collimated light or a laser) is employed without light pipes. Either of aforementioned embodiments may be employed to implement the light pipe sensor 112.

A doubles detector 122 is positioned at the end of the transport path 110 before the divert gate 120. The doubles detector 122 may employ any suitable technique for detecting if multiple notes were withdrawn from a cassette, such as by measuring the thickness of the note or determining whether a note is taking too long to pass (e.g., a partially overlaid note). The doubles detector 122 is coupled with controller 114 Thus, if the doubles detector 122 detects potential doubles or other problems with notes on transport path 110, the controller 114 can divert the notes via the divert gate 120 to the divert/retract cassette 118.

The shuttle entry sensors 124, comprise a plurality of sensors for detecting a plurality of potential problems with notes entering the shuttle 116. For example, the shuttle entry sensors 124 may include, but are not limited to, sensors that calculate skew, determine the gap between notes, and determine curl (e.g., if a note is not flat).

Figure 2:
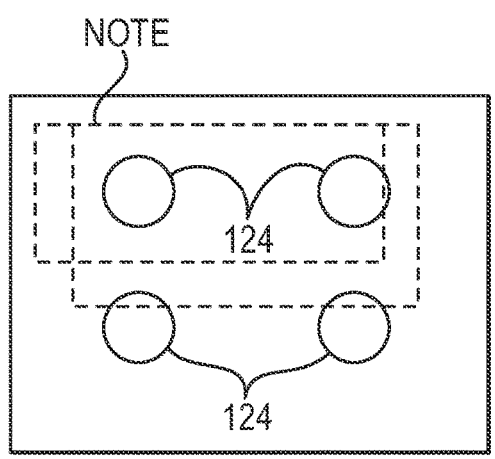
FIG. 2 illustrates an example of shuttle entry sensors detecting a folded or curled note.

FIG. 2 illustrates an example of four shuttle entry sensors 124 operable to detect curl. The sensors 124 are positioned so that when a bill passes, at some point in time all of the sensors will be blocked. However, as illustrated in FIG. 2, if a bill has curled or folded, at least one row of sensors will not be blocked.

Figure 3:
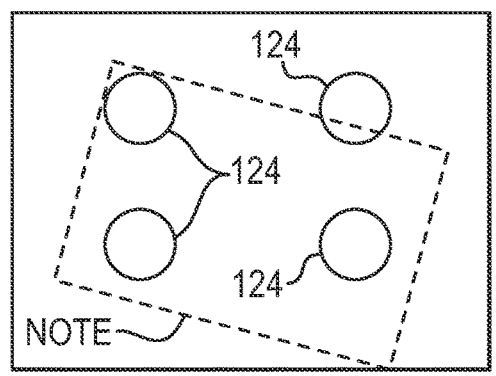
FIG. 3 illustrates an example of shuttle entry sensors determining the skew of note.

FIG. 3 illustrates an example of calculating the skew of a note. The skew can be calculated by the time difference when sensors 124 in a horizontal row are blocked.

Based on signals from the shuttle entry sensors 124, the controller 114 can determine whether there was a problem with a note entering the shuttle 116. If the controller 114 determines that there was problem with a notes entering the shuttle 116, the controller 114 can dump the notes out of the shuttle 116 into the divert/retract cassette 118.

Figure 4:
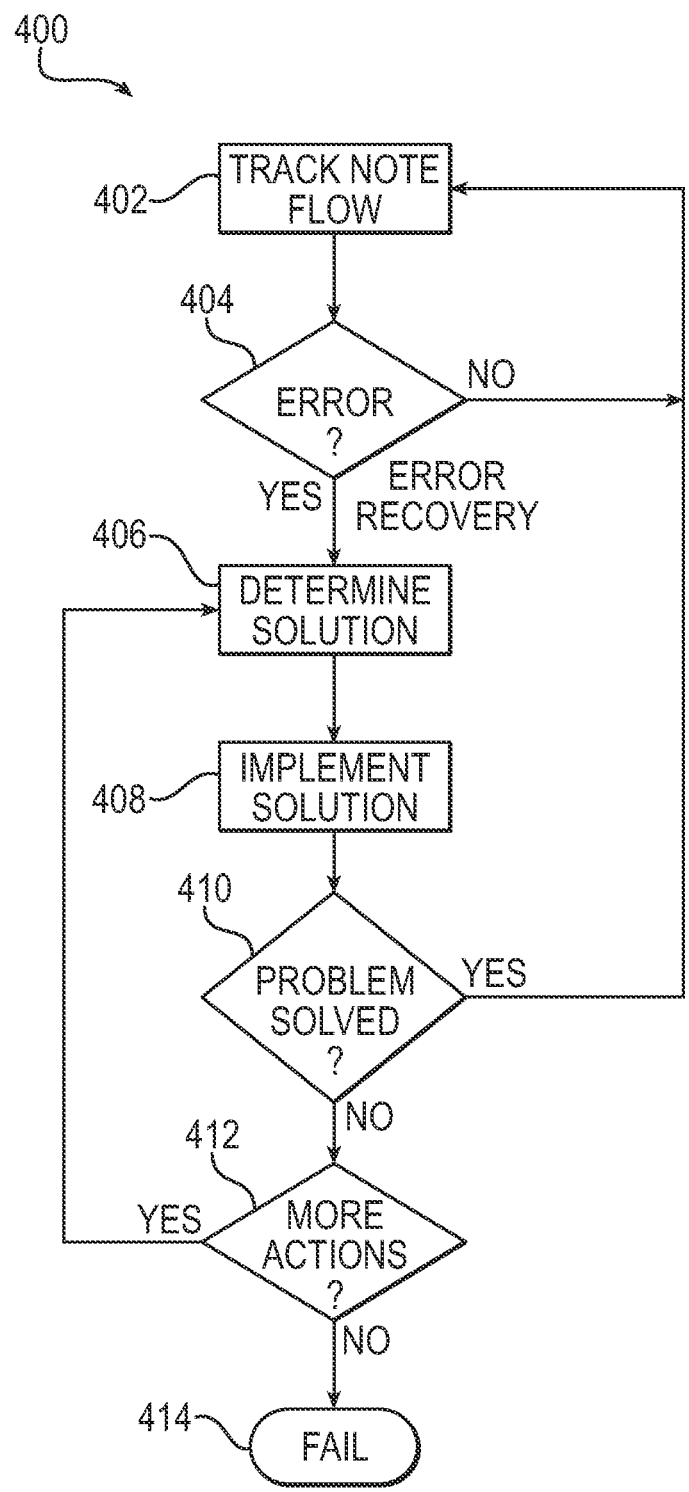
FIG. 4 is a block diagram illustrating a methodology for note error recovery.

In view of the foregoing structural and functional features described above in FIGS. 1-3, a methodology 400 in accordance with an example embodiment will be better appreciated with reference to FIG. 4. While, for purposes of simplicity of explanation, the methodology 400 of FIG. 4 is shown and described as executing serially, it is to be understood and appreciated that the example embodiment is not limited by the illustrated order, as some aspects could occur in different orders and/or concurrently with other aspects from that shown and described herein. Moreover, not all illustrated features may be required to implement an example embodiment. The methodology 400 described herein is suitably adapted to be implemented in hardware, software when executed by a processor, or a combination thereof. For example, the methodology 400 may be implemented by controller 114 in FIG. 1.

At 402, tracking of a note flow from a cassette (e.g., one or more of cassettes 102, 104, 106, 108) to the shuttle 116 begins. The note flow may suitably comprise a single note or a plurality of notes.

At 404, a determination is made whether an error condition exists. Errors that may be detected include, but are not limited to, double notes detected, an overly skewed note, a curled or folded note, a gap between notes being too small, a missing, stalled, or note not arriving at an expected location (e.g., note detected by a light pipe sensor leaving a cassette but does not arrive at the double detector sensor within a desired time period, or a count mismatch (number of notes arriving sensor or shuttle does not match number of notes withdrawn). A note may be stalled on a horizontal transport (between the cassette and double detector, or on a vertical transport (between double detector and shuttle), If no errors are detected (NO), note flow tracking continues. However, if an error is detected (YES), error recovery is initiated.

At 406, a solution for the error is determined. Example solutions include, but are not limited to starting and stopping a transport (e.g., belts moving notes on a transport path), moving the transport backward (e.g., generally a very short distance, such as less than an inch, to prevent a note from jamming a cassette), dumping the shuttle, sending a chaser note (if note makes it to the shuttle then transport path is clear). For example, in the case of a count mismatch, the shuttle can be dumped and new notes picked.

At 408, the solution selected at 406 implemented. For example, the shuttle may be dumped for a count mismatch or if the gap between notes is too small, or a chaser note may be sent in the case of a missing or stalled note (and in an example embodiment the shuttle is dumped after the chaser note arrives at the shuttle).

At 410, a determination is made whether the solution implemented at 408 cleared the error. For example, if a chaser note was sent, did the chaser note arrive at the shuttle.

If at 410, the determination was made that the error was cleared, e.g., problem solved (YES), tracking of a note flow resumes at 402. Depending on the type of error or whether the shuttle was dumped, a note flow may be restarted.

However, at 410, the determination was made that the error condition still exists (NO), at 412 a determination is made whether there are more actions available to clear the error. These actions may include previously attempted actions. For example, additional chaser notes may be sent until a predetermined threshold number of chaser notes has been sent. As another example, the transport path may be started and stopped multiple times. Still yet another example, a transport path may be started and stopped, and a subsequent act can be to send a chaser note.

If, at 412, more actions are available (YES), the next solution is determined at 406 and at 408 the next solution is implemented, and at 410 a determination is made whether the next solution solved the problem. However, if at 412, no more actions are available (NO), a failure condition is entered. This may result in the automated banking machine being taken out of service.

Figure 5:
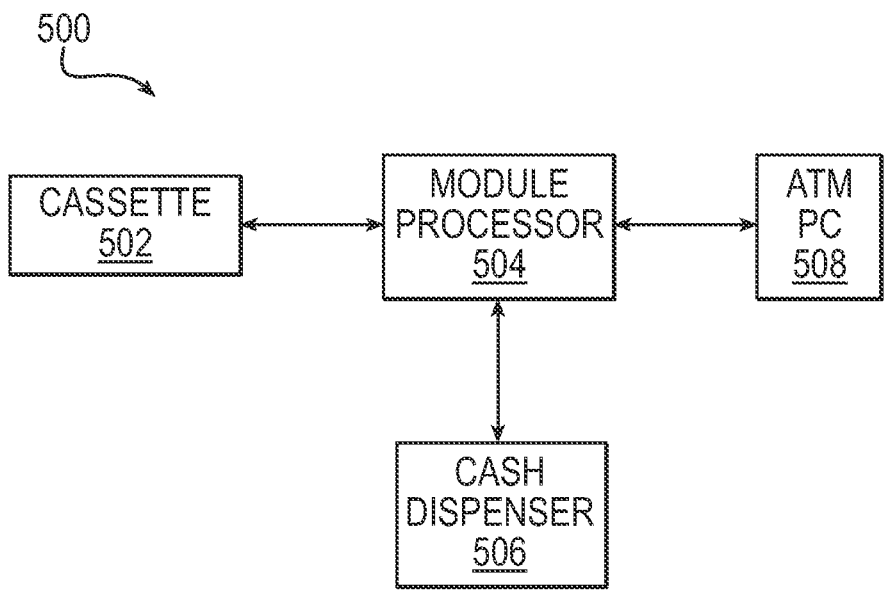
FIG. 5 is a block diagram illustrating an example of internal communications between components of an automated banking machine upon which an example embodiment may be implemented.

FIG. 5 is a block diagram illustrating an example of internal communications between components of an automated banking machine 500 upon which an example embodiment may be implemented. The automated banking machine 500 comprises a cassette module having a processor 502, a core module processor 504 (for example may be part of controller 114 in FIG. 1) that is coupled with a cash dispenser 506 and a controller 508 (e.g., an ATM personal computer or "PC") for the automated banking machine 500.

In accordance with an example embodiment, there is disclosed herein a secure protocol for communications between the cassette 502 and the core module processor 504. In an example embodiment, because of limited communication capabilities, communications between the cassette 502 and module processor 504 is limited to a small number of bytes, for example ten (10) bytes. In an example embodiment, a hybrid protocol is employed to secure the communications.

Figure 6:
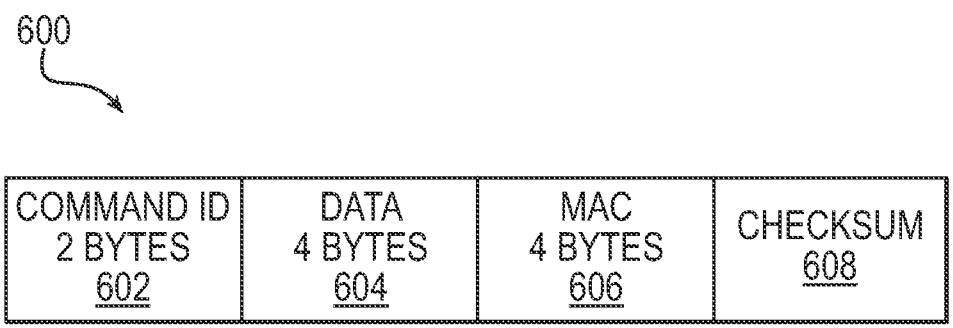
FIG. 6 illustrates an example of a packet format for secure communications between components of the automated banking machine illustrated in FIG. 5.

FIG. 6 illustrates an example packet format 600 for secure communications between the cassette 502 and core module processor 504 illustrated in FIG. 5. The packet format 600 comprises a 1 byte command identifier (ID) 602, data (4 bytes) 604, a message authentication code ("MAC")(4 bytes) 606, and a checksum 608 that are generated by the cassette 502 and the core module processor 504 as follows.

The command identifier and data to be sent (e.g., payload) are generated. A message authentication code ("MAC") is obtained from a hash of the command identifier and payload is taken. In an example embodiment, because the hash is greater than 4 bytes, for example in one embodiment the hash is 20 bytes, four bytes from the hash are selected to be the MAC for the packet. For example, the first four bytes may be selected, however, those skilled in the art should readily appreciate that any four bytes may be selected, and in particular embodiments, the selected bytes may vary by packet (e.g., the first packet uses the first 4 bytes of a hash, the second packet uses bytes 2-5, etc.). The checksum 608 is generated based on the command ID 602, payload 604, and MAC 606.

In particular embodiments, a stain or Nonce is employed. This can ensure that different packets have different MACs even if they have the same command identifier and payload.

Figure 7:
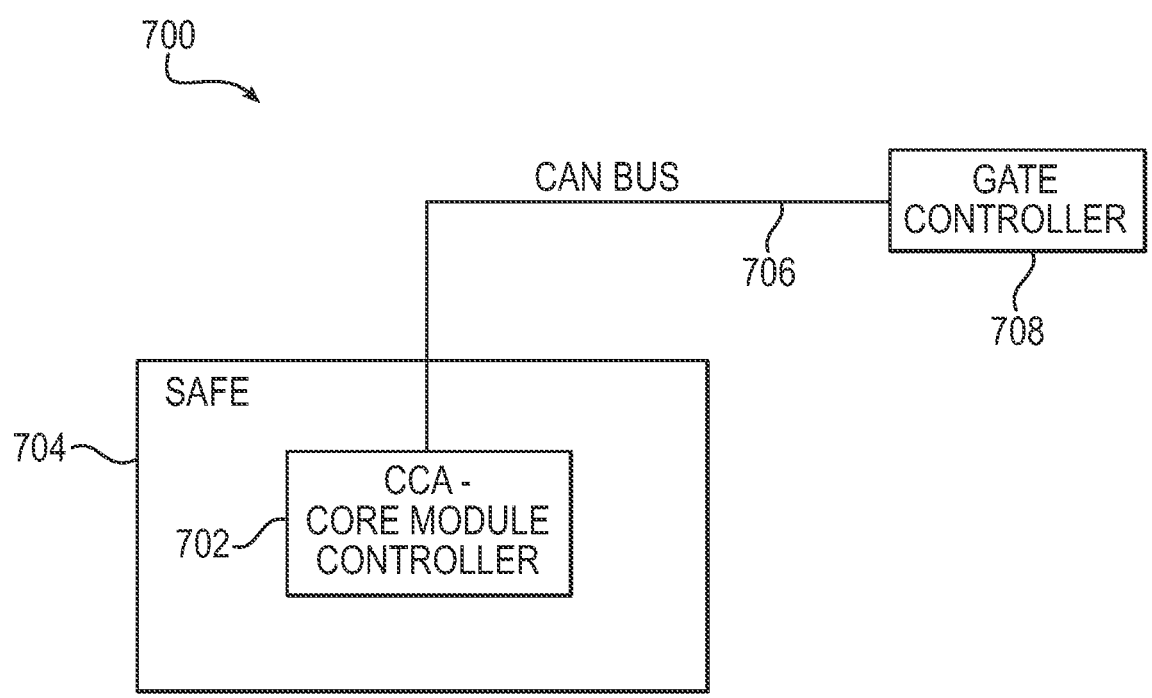
FIG. 7 illustrates an example of an automated banking machine where a controller in a safe employs a secure communication protocol on a Controller Area Network (CAN) bus with a gate controller in accordance with an example embodiment.

FIG. 7 illustrates an example of an automated banking system 700 where a controller 702 (circuit card assembly "CCA" core module controller) in a safe 704 employs a secure communication protocol on a CAN bus 706 with a gate controller 708 in accordance with an example embodiment. In an example embodiment, the controller 702 is a module controller, such as for example controller 114 in FIG. 1 that is located within a secure area (e.g., a safe or any area where cash or any other valuables are stored) within the automated banking machine. Secure communications can be employed to prevent unauthorized access (e.g., opening) of the gate or to prevent unauthorized commands being sent to the module controller that may request cash be delivered to the gate. The gate controller 708 is located at a customer interface printed circuit board assembly (CI PCBA, which may also be referred to herein simply as "CI"). Although the examples herein are directed to a (module) controller 702 and a gate 708 of an automated banking machine 700, those skilled in the art should readily appreciate that the example embodiments described herein can be applied to any two nodes communicating on an unsecured bus such as a CAN bus.

In an example embodiment, security commands establish the keys, determine if the controller 702 (also referred to herein as the "main") and the gate controller 708 are properly bonded and in general allow the controller 702 and the gate controller 708 to communicate with integrity. In an example embodiment, the gate controller 708 may be implemented on a PSoC® (Programmable System On a Chip) available from Cypress Semiconductor Corporation™ Champion Court San Jose CA 95134). Those skilled in the art should readily appreciate that although some of the illustrated examples employ a PSoc®, the principles described herein may be implemented on any suitable processor.

In an example embodiment, keys are 8 bytes in length, Message Authentication Codes (MAC) are the upper 3 bytes of the hash of Msg id+message payload+key or stain (unless otherwise stated for a given message). In an example embodiment, the hash is a SHA1 (secure hash algorithm 1), the Factory Default key ("FD" or "FDK") is used to bond controllers 702 and 708, then a secure symmetric key (SK) known to the controllers 702 and 708 is employed.

In an example embodiment, a Stain (or Nonce) may employed to protect against replay attacks. For example the stain may be a rolling 8 byte key that is hashed with the message data. The stain may be Incremented prior to usage to generate a MAC (transmit) or confirm a MAC (receive). In particular embodiments, both the controller 702 and the controller 708 are little endian processors. For processor efficiency, the most significant byte of the 8 byte key is considered the least significant in terms of incrementing. The higher 4 bytes are incremented.

In an example embodiment, the hash used to confirm validity of the application is a full 20 bytes. A controller 708 (PSoC) 'read' is actually a write to the PSoC and a response from the PSoC with the associated data at that address. In an example embodiment, since the 'read' data is authentic, the 'write' portion of the cycle does not need to be secured.

In an example embodiment, if a MAC fails during the Challenge, Set Key and Bond sequence, the module controller 702 is power failed and the sequence is restarted. This is done to ensure the integrity of communications on the bus and to keep an intruder from replaying message in order to figure out the key.

In an example embodiment, if a MAC fails during the Challenge and Set Stain sequence, the circuit card assembly ("CCA") must be power failed and the sequence is restarted. This is done to ensure the integrity of communications on the bus and to keep an intruder from replaying message in order to figure out the key.

Figure 8:
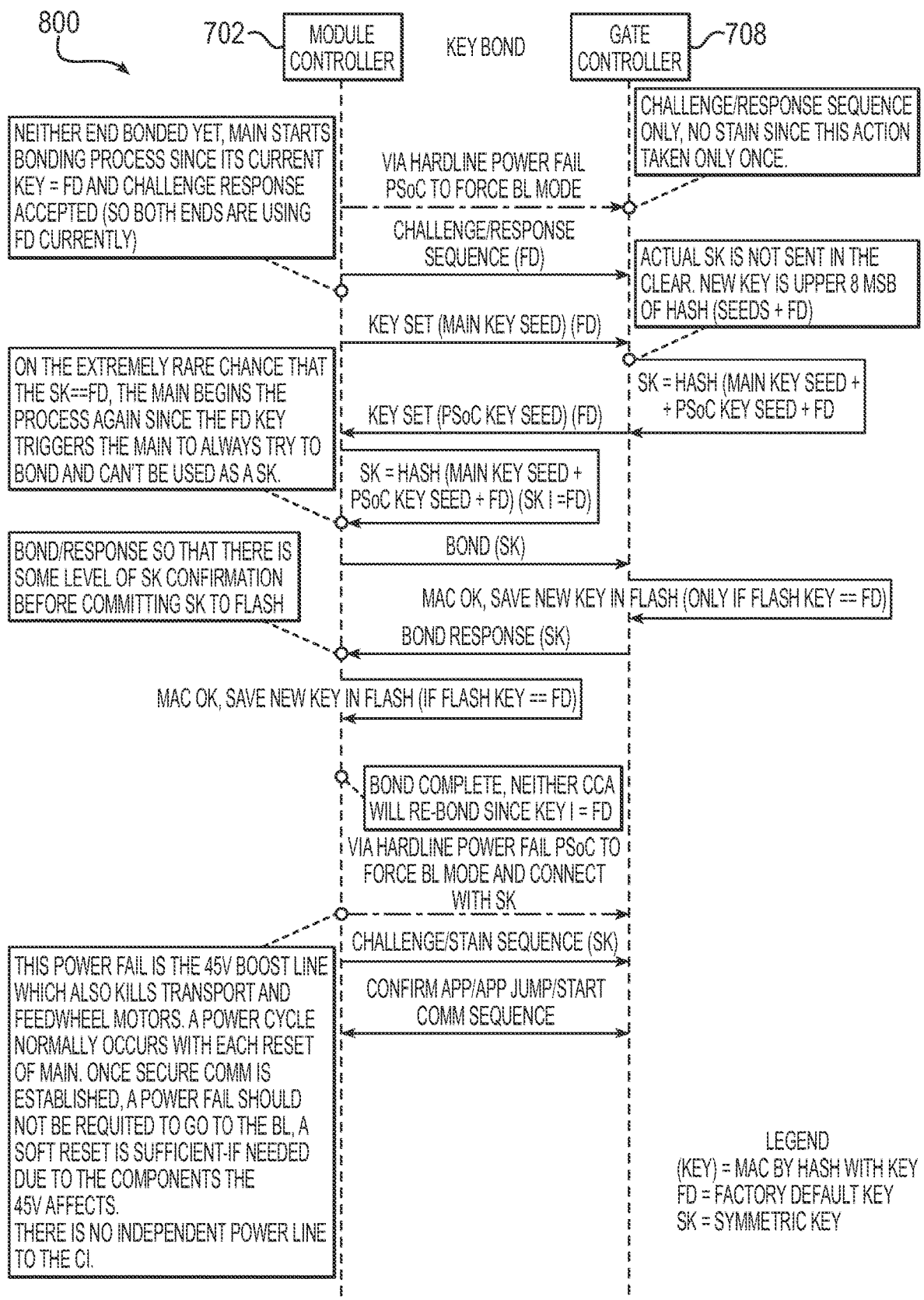
FIG. 8 illustrates an example signal diagram illustrating a process for initial key bonding between two nodes on a CAN bus.

FIG. 8 illustrates an example signal diagram 800 illustrating a process for initial key bonding between two nodes on a CAN bus. For example, the signal diagram 800 may be employed by module controller 702 and gate controller 708 in FIG. 7 for initial key bonding.

Figure 9:
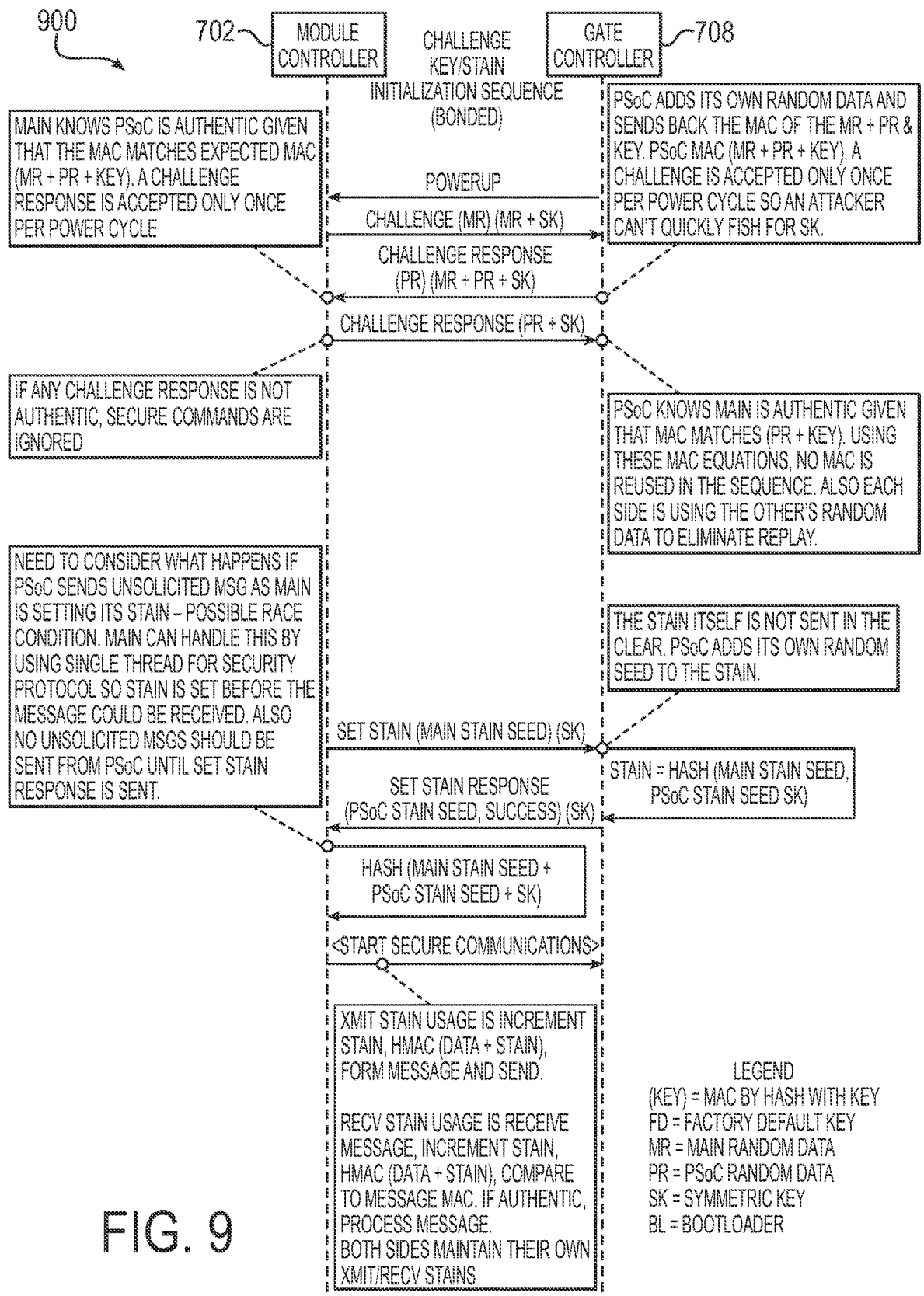
FIG. 9 illustrates is a signal diagram illustrating an example of a process for setting up a stain (Nonce) between the two nodes that bonded keys in FIG. 8.

FIG. 9 illustrates is a signal diagram 900 illustrating an example of a process for setting up a stain (Nonce) between the two nodes that bonded keys in FIG. 8. For example, the signal diagram 800 may be employed by module controller 702 and gate controller 708 in FIG. 7 for initial key bonding.

Figure 10:
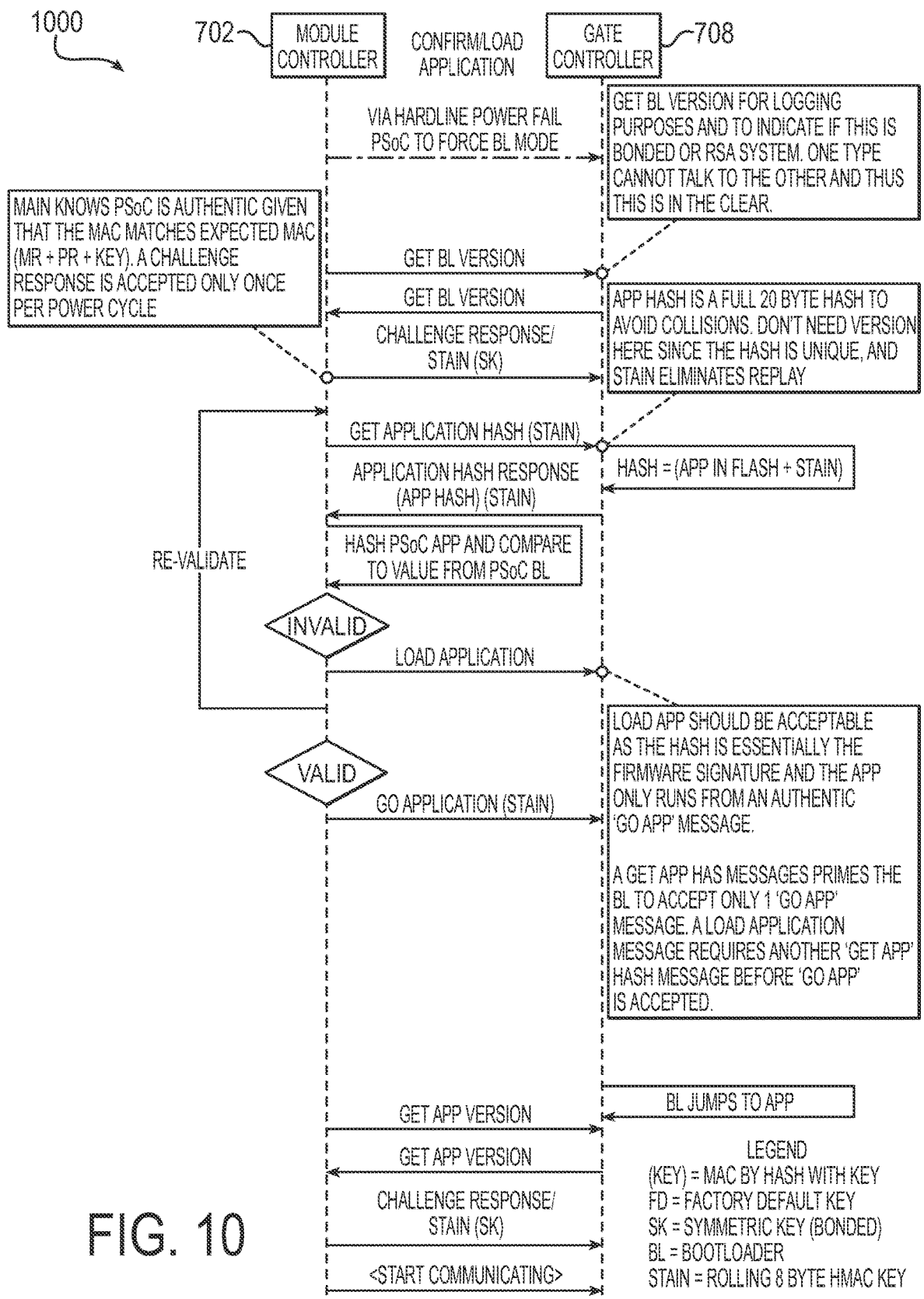
FIG. 10 is a signal diagram illustrating an example of a process for application verification and initialization for two nodes securely communicating on a CAN bus.

FIG. 10 is a signal diagram 1000 illustrating an example of a process for application verification and initialization for two nodes securely communicating on a CAN bus. For example, the signal diagram 800 may be employed by module controller 702 and gate controller 708 in FIG. 7 for initial key bonding.

In an example embodiment, a sequence of messages may be employed by a node to determine if the other node is bonded (e.g., knows the current key). Both nodes in the sequence contribute their own random data to prohibit a replay scenario. In an example embodiment, messages with random "seed" data do not include the command ID as part of the HMAC (Hashed Message Authentication Code). For example, FIG. 11 illustrates an example of a packet format 1100 employed by controller 702 (main in this example) to gate controller 708 (PSoC in this example). In response, the gate controller 708 (PSOC in this example) sends a response. In the response, the gate controller 708 adds its own random data and MAC's the series of random numbers and sends a response back to the module controller 702 (main in this example). An example of the response 1200 is illustrated in FIG. 12. The controller 702, sends a response to the response sent by the gate controller 708. In the response sent by the module controller 702 (or main in this example) MACs the random data sent by the gate controller (or PSoc in this example) and returns the MAC of the random data sent by the gate controller 708 to the gate controller. FIG. 13 illustrates an example of a challenge response 1300 from the gate controller.

FIGS. 14 and 15 illustrate an example of message formats 1400 and 1500 respectively for a sequence of messages to set a stain between two nodes on a CAN bus. Both nodes (module controller 702 and gate controller 708 referred to as main and PSoc respectively in the illustrated example) provide their own seeds to the stain. The stain is the hash of the main seed, the PSoc seed, and the secure key (e.g., Stain=hash(main seed+PSoC seed+SK). Both nodes 702, 708 provide their own seed to protect against replay attacks. FIG. 14 is an example of a message format 1400 for a set stain message sent from the module controller (main) 702 to the gate controller 708 for initialization of the data. FIG. 15 is an example message format 1500 of the response sent by the gate controller (PSoc) 708 with the gate controller's' 708 seed so that both nodes have the same random data and are using the same hash and key and can initialize the same value for the stain. In an example embodiment, the 8 most significant bytes of the SHA1 hash of the Main Seed (4 bytes) plus the (PSoC) Seed (4 bytes) and the Secure Key (8 bytes) becomes the "Stain" and is used for future secure communication. In an example embodiment, the Factory Default key is not used to set the stain.

FIGS. 16-18 illustrate example message formats for a sequence of messages to bond two nodes on a CAN bus with a symmetric key. A command/response begins the bonding process that changes the factory default key to the secure key that is known to the two nodes (e.g., module controller 702 and gate controller 708) and is stored in protected flash memory. Both nodes provide a seed for the symmetric key (SK). The SK uses a hash of module controller 702 (main) and gate controller 708 (PSoC) seeds hashed with the FD. The seeds are random data of 4 bytes. FIG. 16 illustrates an example of a message format 1600 for a key set command. FIG. 17 illustrates an example of a message format 1700 for a key set response.

In an example embodiment, the 8 most significant bytes of the SHA1 hash of the Main Seed (4 bytes) plus the (PSoC) Seed (4 bytes) and the Factory Default Key (8 bytes) becomes the "Secure Key" and is used for establishing the "Stain". The Secure Key is not set equal to the Factory Default Key.

Once the key set is successful, the bond message instructs the PSoC to write the SK to flash. The message is authenticated by using the SK calculated from the Key Set sequencing. The bond response confirms receipt of the bond and causes the main to write the SK to its flash, if the message is authentic. Once bonded, neither the Main or PSoc will re-bond. The bond command and response have the same format 1800 that is illustrated in FIG. 18.

FIGS. 19-23 illustrate message formats for a sequence of messages employed to validate loaded firmware. For example, these message can allow the module controller 72 (main) to validate the firmware of the gate controller (PSoC) and command the bootloader to run its application.

FIG. 19 illustrates an example message format 1900 of a get application hash command. This command instructs the gate controller (PSoc) 708 to calculate the hash of the application in its flash memory. The gate controller (PSoc) 708 sends a response. In the illustrated example, the response is sent in 4 segments with 5 bytes and the standard MAC, however, those skilled in the art should readily appreciate that other formats for the response are possible. FIG. 20 illustrates an example of a format 2000 for the first response message, FIG. 21 illustrates an example of a format 2100 for the second response message, FIG. 22 illustrates an example of a format 2200 for the third response message, and FIG. 23 illustrates an example of a format 2400 for the fourth response message.

Figure 25:
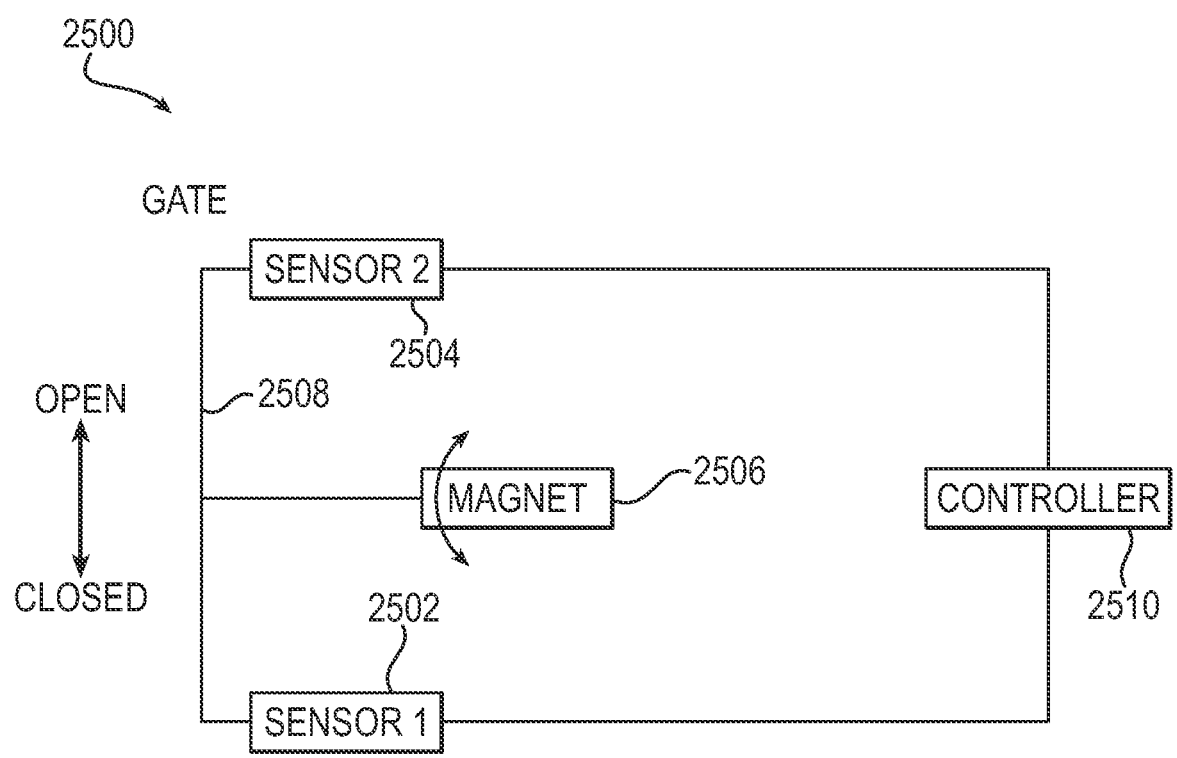
FIG. 25 illustrates an example of a gate security system for an automated banking machine.

Once the gate controller 702 (main) determines the application is valid, the gate controller (main) 702 sends a run application command to instruct the boot loader to jump to its application. There is no response to this command as the application is next to run. FIG. 24 is an example message format 2400 for a run application command on a CAN bus employing a secure communication protocol FIG. 25 illustrates an example of a gate security system 2500 for an automated banking machine. The gate security system comprises two fixed sensors (sensor 1) 2502, (sensor 2) 2504, and a rotating magnet 2506 that is coupled with the gate 2508. When the gate 2508 is fully closed, sensor 2502's sial goes from a first state (for example a low state (e.g., 0 v) while sensor 2500's signal maintains a second state (for example a half voltage (e.g., 2.5 v for this example). When the gate 2508 fully opens, sensor 2502's signal goes to the second state (a half voltage (e.g., 2.5 v)) while sensor 2504's voltage goes third state (for example a high voltage state (e.g., 5.0 v)). Based on these sensor signals, a controller 2510 can determine the current state of the gate 2508.

Figure 26:
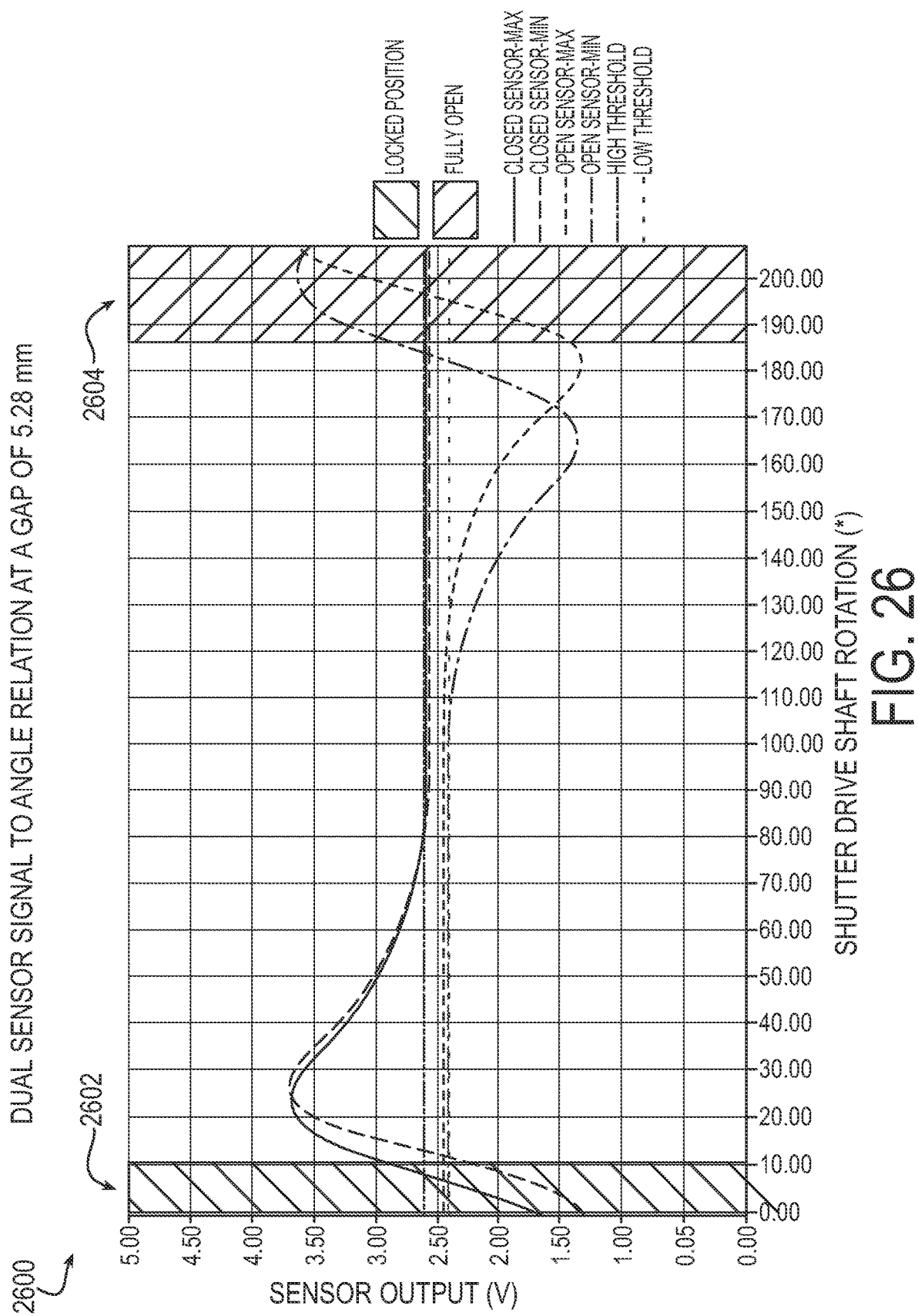
FIG. 26 illustrates an example of sensor signals for the security system described in FIG. 25.

FIG. 26 illustrates an example of sensor signals 2600 for the security system described in FIG. 25. The left side 2602 illustrates signals when the gate is considered fully closed. The right side 2604 illustrates the signals when the gate is fully opened.

Figure 27:
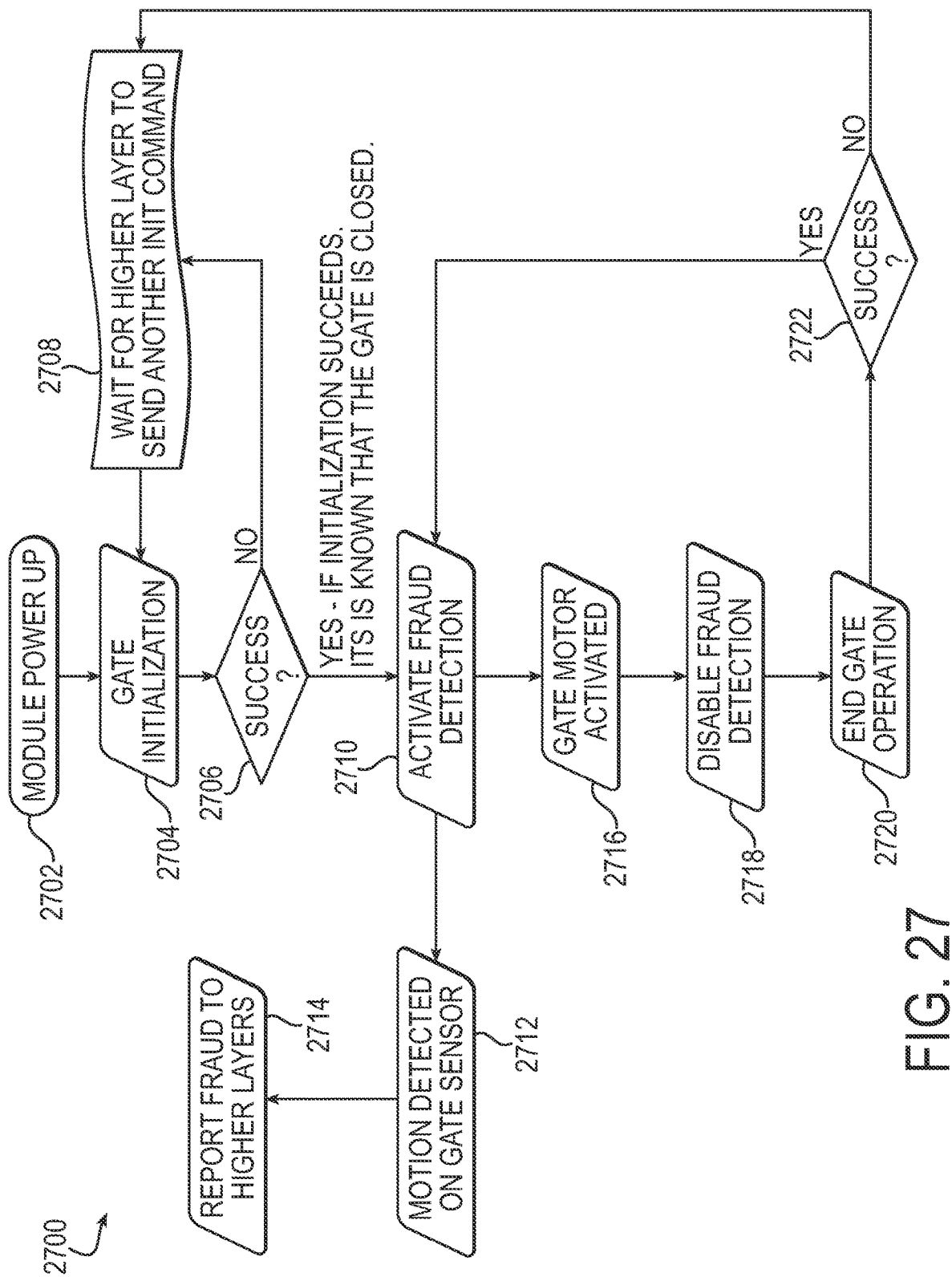
FIG. 27 illustrates an example methodology for protecting a gate of an automated banking machine.

FIG. 27 illustrates an example methodology 2700 for protecting a gate of an automated banking machine. In normal operations, the gate motor (not shown) is commanded to operate, which causes the magnet to move and the magnet-sensors (2502, 2504 in FIG. 25) signals are analyzed by controller (2510 in FIG. 25). When the gate is closed, this is detected by the magnet 2506 (FIG. 25) resting over sensor 1 2502 (FIG. 25). If the controller 2510 (FIG. 25) detects movement based on signals from sensors 2502, 2504 (FIG. 25) while the motor is not running, this will indicate an unusual condition (e.g., tampering of the gate 2508 in FIG. 25). Upon detecting a potential tampering condition, the controller 2510 may take any desired action, such as generating an alarm, create a log entry, etc.

Methodology 2700 begins at 2702 when the module powers up. At 2704, the gate initializes.

At 2706, if the gate did not successfully initialize (NO), the module waits for a higher layer (e.g., the ATM processor or other processor/controller such as CCA Core module controller 702 in FIG. 7; module processor 504 in FIG. 5). Upon receiving a command to initialize (INIT), the gate attempts to initialize as illustrated at 2704.

If, at 2706 the gate successfully initialized (YES), it is known at this point the that gate is closed. Fraud detection is then activated.

While fraud detection is activated, sensors detect any motion of the gate as described herein. If motion is detected by a gate sensor, as illustrated by 2714, the gate controller determines that tampering or a fraud is being attempted. As illustrated by 2704, the gate controller may report the fraud/tampering attempt to a higher layer processor. However, as those skilled in the art can readily appreciate, the gate controller may also initiate other actions.

When the gate is operated (e.g., opened) by the gate controller, at 2716, the gate controller activated. At 2718, fraud detection is disabled. This prevents erroneous reporting of tampering or fraud attempts. At 2720, after the gate is done operating, the gate is closed. If, at 2722, the gate successfully closed (YES), processing returns to 2710 and fraud detection is activated. However, if, at 2722, the gate did not successfully close (NO), operation of the gate stops and the gate controller waits for a higher layer to send an initialization command as indicated by 2708. In particular embodiments, the gate controller may also generate an alarm or a report to a higher layer responsive to determining the gate could not close after operation.

Figure 28:
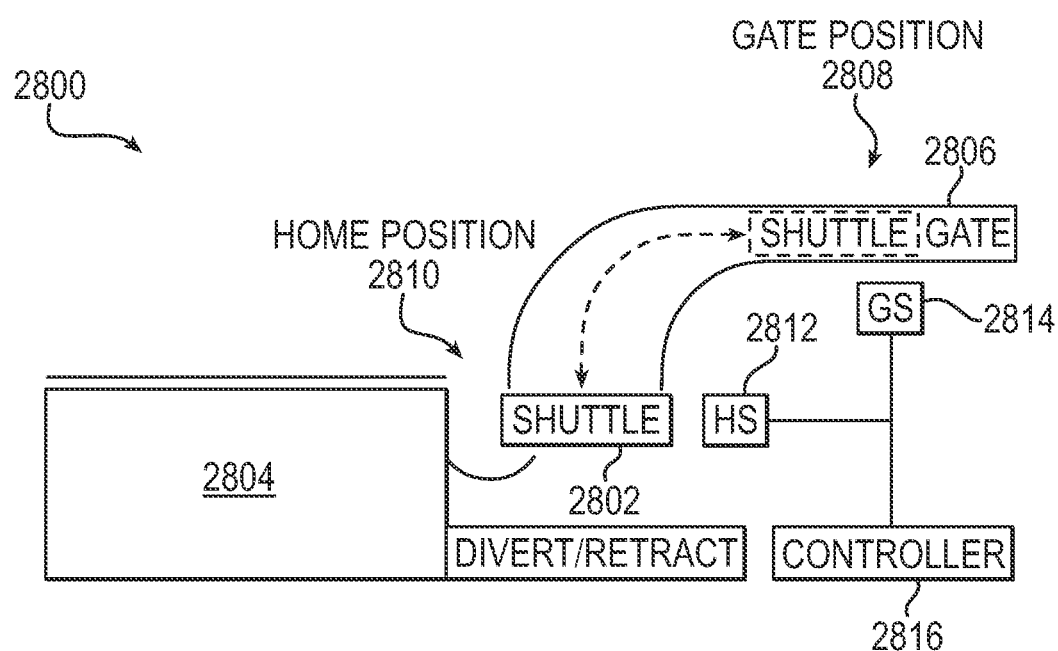
FIG. 28 illustrates a system for detecting tampering of a shuttle in an automated banking machine.

FIG. 28 illustrates a system 2800 for detecting tampering of a shuttle in an automated banking machine. In an example embodiment, the shuttle 2802 is employed to convey currency notes from the core module 2804 to a customer at the gate 2806. The shuttle 2802 has two resting positions where no movement is expected. They are the at gate (customer) position 2808 and the at home (stacking, in safe) position 2810. These positions 2808, 2810 represent the two extreme ends of the shuttle track. In an example embodiment, a sensor, such as a hall sensor, is located a few millimeters from the ends of the tracks such that the shuttle magnet (not shown) will pass the sensor as it approaches the end/resting position. These sensors 2812, 2814 serve a dual purpose. When approaching an end, the firmware (controller 2816) can detect the shuttle 2802's distance from the end of the track, from this point the firmware commands the stepper motor to move a number of steps to reach the track end. Once the shuttle has reached the track end and no movement is expected the firmware monitors the sensor 2812 or 2814 depending on which end the shuttle is located, for activity. If activity is detected and the shuttle has not been commanded to move the firmware assumes an outside force is moving the shuttle and declares a tampering event. The technique describe above is used at both ends of the shuttle track to detect unauthorized shuttle movement.

FIG. 29 is contains several views illustrating an example of a shuttle in an automated banking machine upon which an example embodiment may be implemented. The shuttle illustrated in FIG. 29 is suitable to implement shuttle 116 (FIG. 1) and/or shuttle 2802 (FIG. 28).

Figure 29A:
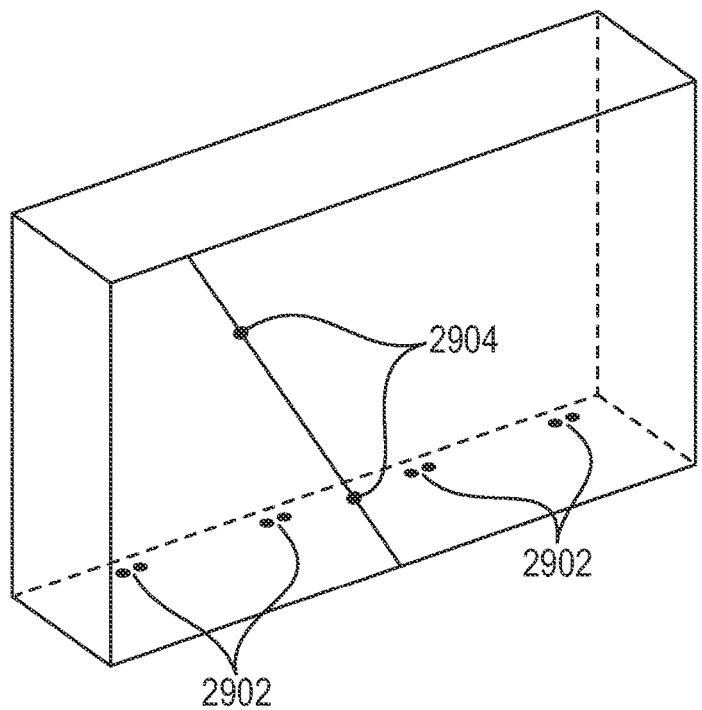
FIG. 29A illustrates a perspective view of a shuttle in an automated banking machine upon which an example embodiment may be implemented.

FIG. 29A illustrates a perspective view of the shuttle. This view illustrates the shuttle entry sensor transmit and receive points 2902 and shuttle media sensor transmit and receive points 2904.

Figure 29B:
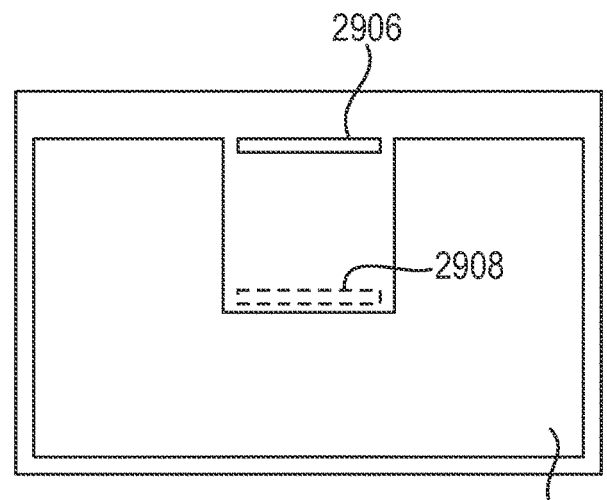
FIG. 29B illustrates an example of a front view of the shuttle illustrated in FIG. 29A.

FIG. 29B illustrates an example of a front view of the shuttle. This view Illustrates the high note stop position 2906, the low note stop position 2908, and a plate 2910.

Figure 29C:
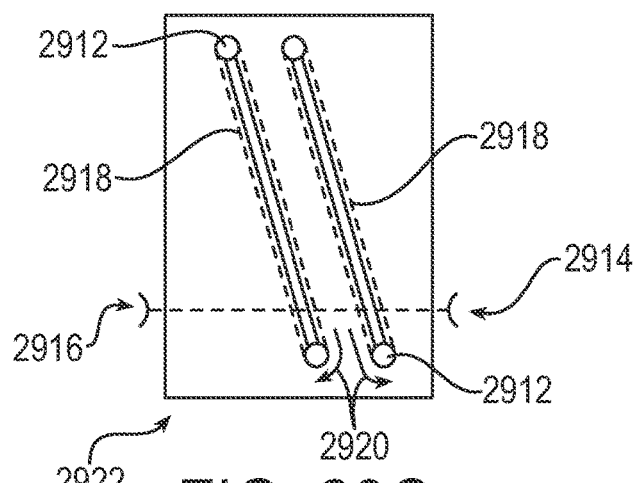
FIG. 29C illustrates an example side view of the shuttle illustrated in FIG. 29A.

FIG. 29C illustrates an example side view of a shuttle. This view illustrates the plate pivot 2912, shuttle media sensor (emitter "TX" 2914 and receiver "RX" 2916), and the present belts 2918. Arrows 2920 indicate the forward direction for belts 2918 The shuttle entry 2922 is at the bottom of the illustrated example. A Cam motor is external to the shuttle. The Cam motor moves a cam that performs several actions within the shuttle, some of which will be described in FIG. 30. For example, moving the note stop actuator and spreading the shuttle plates are two functions described in FIG. 30. The belt motor moves the present belts. The present belts can move notes held by the shuttle plates. When the belts are turned in a forward direction, they will move notes out of the shuttle (this is the direction where notes move toward a customer when the shuttle is at the gate, and down when the shuttle is at the home position (see e.g., FIG. 28). the reverse direction pulls notes into the shuttle.

Figure 30:
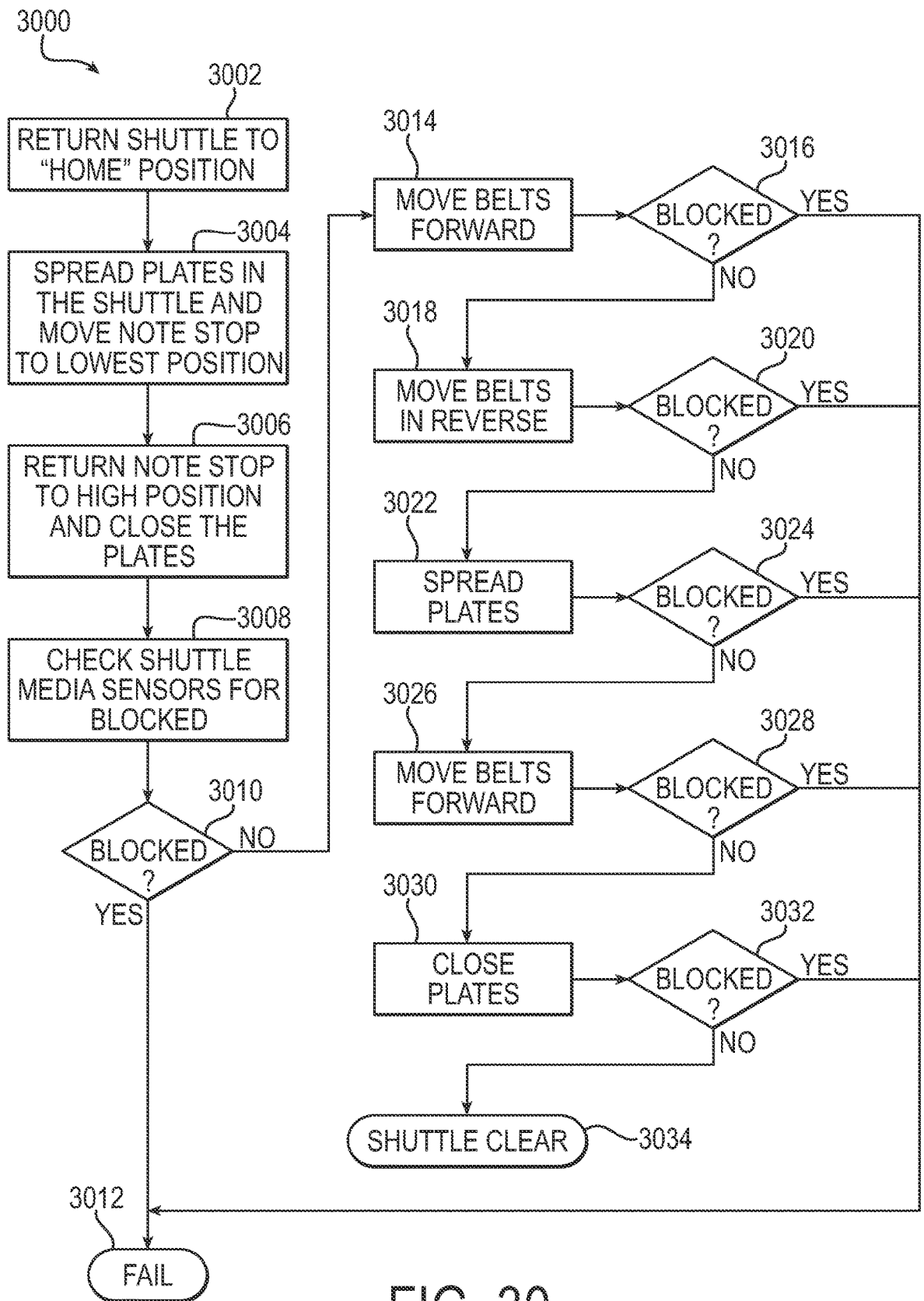
FIG. 30 is a block diagram of a methodology for detecting notes in the shuttle described in FIG. 29.

FIG. 30 is a block diagram of a methodology 3000 for detecting notes in the shuttle described in FIG. 29. The methodology 3000 may be performed by a controller (such as controller 2816 in FIG. 18 or controller 114 in FIG. 1) operatively coupled to the shuttle, the cam motor, and the belt motor.

After a customer removes notes from the shuttle, the following actions occur to verify the customer has taken all of the notes presented:

At 3002, the shuttle returns to its home position. For example this would be the position 2810 in FIG. 28.

At 3004, the cam motor is commanded to spread the plates in the shuttle and move the note stop to the lowest position. This can loosen any notes stuck high in the shuttle.

At 3006, the cam motor is commanded to return note stop to high position and close the plates.

At 3008, the shuttle media sensors are checked for blockage. If the shuttle media sensors are blocked, notes are still in the shuttle. Thus, if at 3010 the media sensors are blocked (YES), a fail state is entered as indicated by 3012. Any suitable action may be taken in response to the shuttle being in a fail state. For example, the shuttle may be retained (e.g. locked) in the home position until the shuttle is inspected and/or serviced. In an example embodiment, notes in the shuttle are dumped into a divert/retract cassette (see e.g., divert/retract cassette in FIG. 1) and a log entry is created identifying the transaction and that notes were dumped into the divert/retract cassette. The methodology 300 may then be implemented, and notes are still detected in the shuttle, the shuttle may be retained (e.g. locked) in the home position until the shuttle is inspected and/or serviced.

If at 3010, the shuttle media sensors are not blocked (NO), at 3014 the present belt motor is commanded to move the belts in a first (e.g., forward) direction (for example, 90 mm). The shuttle media sensors are monitored for blockage as indicated by 3016. If at 3016, the media sensors are blocked (YES), notes are in the shuttle and the fail condition at 3012 is entered.

If, at 3016, the media sensors are not blocked (NO), at 3018 the present belt motor is commanded to move belts in a second (e.g., reverse) direction (for example, 90 mm). The shuttle media sensors are monitored for blockage as indicated by 3020. If at 3020, the media sensors are blocked (YES), there are notes in the shuttle and the fail state indicated by 3012 is entered.

If at 3020, the media sensors are not blocked (NO), at 3022, the cam motor is commanded to spread the plates in the shuttle. The shuttle media sensors are monitored for blockage as indicated by 3024. If at 3024, the media sensors are blocked (YES), there are notes in the shuttle and the fail state indicated by 3012 is entered.

If, at 3024, the media sensors are not blocked (NO), at 3026, the present belt motor is commanded to move belts in a first (e.g., forward) direction (for example 90 mm). The shuttle media sensors are monitored for blockage as indicated by 3028. If at 3028, the media sensors are blocked (YES), there are notes in the shuttle and the fail state indicated by 3012 is entered.

If, at 3028, the media sensors are not blocked (NO), at 3030, the cam motor is commanded to close the plates in the shuttle. The shuttle media sensors are monitored for blockage as indicated by 3032. If at 3032, the media sensors are blocked (YES), there are notes in the shuttle and the fail state indicated by 3012 is entered.

If, at 3032, the shuttle sensors are not blocked (NO), then the shuttle is considered clear.

Figure 31:
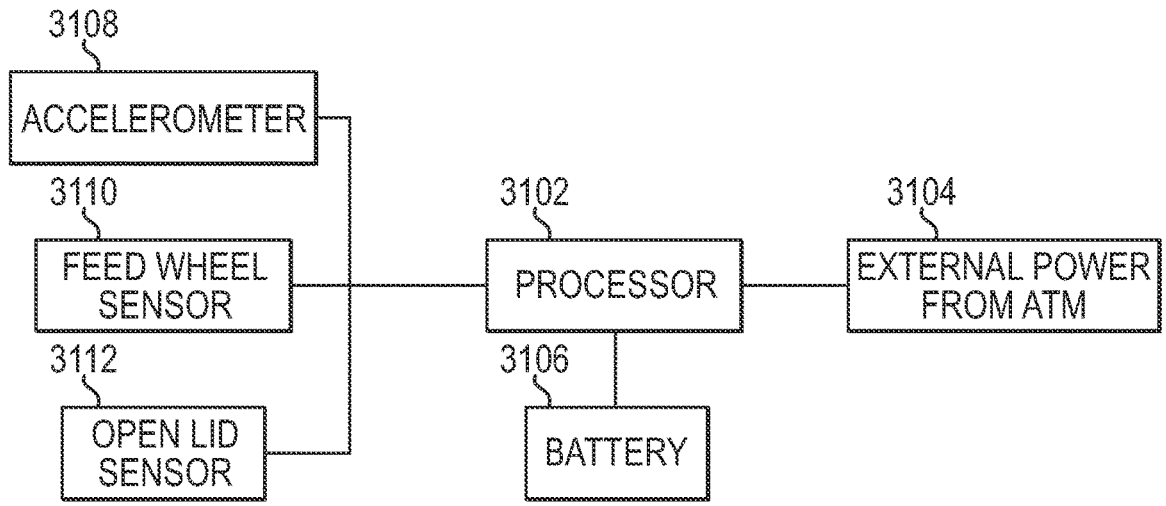
FIG. 31 illustrates an example of a low power cassette security system.

FIG. 31 illustrates an example of a low power cassette security system 3100. The lower power security system 3100 comprises a processor 3102 that may be coupled with an external power source 3104 (e.g., when installed in to an automated banking machine), and be provided with power from a battery 3106 when not coupled with the external power source 3104. The processor 3102 is operable to receive signals from an accelerometer 3108, a feed wheel sensor 3110, and an open lid sensor 3112.

In an example embodiment, when the processor is not coupled to the external power source 3104, the processor enters a lower power (sleep) mode. In an example embodiment, the accelerometer 3108, the feed wheel sensor 3110, and the open lid sensor 3112 are operable to wake up the processor upon detection of certain events. For example, the accelerometer may wakeup the processor 3102 upon detecting that the cassette was dropped. The feed wheel sensor 3110 may wakeup the processor 3102 upon detecting movement of the feed wheel. The open lid sensor may wakeup the processor 3102 in response to detecting the lid of the cassette was opened.

Upon waking from a signal received from one or more of the accelerometer 3108, the feed wheel sensor 3110, or the open lid sensor 3112, the processor 3102 may take action in accordance with its programming. In particular embodiments, the processor 3102 may log the event, and upon being coupled with an automated banking machine, the processor 3102 may send an alarm to the automated banking machine.

Figure 32:
FIG. 32 illustrates an example of a packet format for a lightweight ATM communication bus protocol in accordance with an example embodiment.

In an example embodiment, there is described herein an lightweight ATM communication bus (LACB) architecture. The LACB uses a tag-length-value (TLV) format to represent XML messages. In an example embodiment, the tag and length are each 32-bit values. Within the tag, 12 bits indicate the namespace and the 12 bits index into a symbol table of names. The length specifies the number of following bytes that are part of the tag. This data may include other TLV definitions. The bit values described herein may be employed for an implementation of the LACB architecture and those skilled in the art should readily appreciate that any bit values may be employed depending upon a desired implementation. Thus, the example embodiments described herein should not be considered as limited by the values used herein. FIG. 32 illustrates an example TLV format 3200 employed in an example embodiment.

In an example embodiment, the LACB uses a symbol table to assign logical names and data types to tag ids. This symbol table is defined using an LACB schema which is either processed at compile time or dynamically processed at run time. The LACB symbol table can be derived from an XML schema via a conversion utility or created directly by the user. There is a 1-to-1 relationship between a symbol table and an XML namespace.

The LACB schema is expressed as an XML file, but, like all messages, is represented in TLV format within the LACB. Therefore, the LACB symbol table includes the namespaces needed to define a schema as used by the LACB.

For each namespace, the symbol table has entries for the names of all elements and attributes. Each entry has a flag to indicate whether it is an element or attribute, a security indicator that determine if it is encrypted, and a type indicator that determines how the value is stored. A subset of the XML schema data types is used to determine how the value is stored:

xsd:integer, xsd:unsigned—a 32-bit value (length is 4)
lacb:hexUnsigned—same as xsd:unsigned, but converted to a hex representation in XML
xsd:dateTime—a 32-bit value representing the date in Unix time (length is 4)
xsd:double—a double precision floating point number (length is 8)
xsd:hexBinary—binary data representing the encoded value of arbitrary length
xsd:boolean—a 32-bit 0 or 1 (length is 4)
Any other data types are stored as an ASCII string representing the original XML content.

Tag Flags

To avoid symbol table lookups within an application, the upper bits of the tag value reflect the symbol table attributes. This allows a message to be self-decoding, without the need for symbol table lookups.

Since many message values are 4 bytes or less, one of the flags indicates a 4-byte length, in which case the length value in the TLV is omitted. The greatly reduces the message size for long lists of numeric data.

The following is the current definition of the bitwise tag flags:

31 (0x80000000)–1 if element, 0 if attribute
30 (0x40000000)–1 if complex element, 0 if simple (has a value)
28 (0x10000000)–1 if Encrypted
27 (0x08000000)–1 if length is 4 and value immediately follows XML Representation An XML element is represented by a TLV value. Element TLV values may contain attribute TLV values and other element TLV values, echoing the structure of the XML document. The special tag, 0x00000000, indicates element content and may occur once within the top level of each element TLV value. Its data type is determined by the data type of the containing element.

As an example, consider this simple XML document:

```
<?xml version="1.0" encoding="utf-8"?>
<top xmlns="http://www.diebold.com/schemas/test"
    xmlns:xsi="http://www.w3.org/2001/XMLSchema-instance"
    xsi:schemaLocation="http://www.diebold.com/schemas/test"
        "testSchema.xsd"
    color="black" shade="light">
  <inner value="42">this is a test</inner>
  <inner value="1234567">this is another test</inner>
  <data>1234567890abcdef</data>
</top>
```

The schema file "testSchema.xsd" is processed, at compile time, or at run time within the ACB-to-LACB Bridge, to result in the following symbol table:

Namespace: "http://www.diebold.com/schemas/test" ID: 0x000A

| Tag | Name | Element/Attribute | Data type |
| --- | --- | --- | --- |
| 0x0001 | top | Element | xs:string, complex |
| 0x0002 | inner | Element | xs:string, complex |
| 0x0003 | data | Element | xs:hexBinary |
| 0x0004 | color | Attribute | xs:string |
| 0x0005 | shade | Attribute | xs:string |
| 0x0006 | value | Attribute | xs:decimal |

Assuming "http://www.diebold.com/schemas/test" is identified by id 10 (0x000A), the resulting TLV data for the above XML would be the following (note that decimal 42 is 0x2A and 1234567 is 0x12D687). For this example, the "4-byte" flag optimization is ignored:

```
C000A001 0000008E 000A004 00000005 "blue" 000A005
00000005 "dark"
  C000A002 00000023 000A006 00000004 0000002A
    00000000 0000000F "this is a test"
  C000A002 00000029 000A006 00000004 0012D687
    00000000 00000015 "this is another test"
  8000A003 00000008 12345678 90ABCDEF
```

Schema Processing

Since peripherals such as device modules do not have internet access and do not have access to storage on the main ATM hard disk, schemas are either directly compiled into module firmware or are read and processed on the main processor and sent to the peripherals at initialization. The LACB schema is a much simplified form of an XML schema, containing the data which is needed to build the symbol table, with the addition of tag ids. When an XML schema is used, it is first converted to an LACB schema for processing by a peripheral. The following is an example of the schema definition that would be sent to a peripheral if processed dynamically, expressed as XML (the actual message would be the equivalent TLV):

```
<lacbSchema xmlns="http://www.diebold.com/schemas/lacb/schema/v1.0"
    xmlns:xs="http://www.w3.org/2001/XMLSchema"
    targetNamespace="http://www.diebold.com/schemas/test"
    targetNamespaceId="10">
  <element name="top" tag="1"/>
  <element name="inner" tag="2"/>
  <element name="data" tag="3" type="xs:hexBinary"/>
  <attribute name="color" tag="4" type="xs:string"/>
  <attribute name="shade" tag="5" type="xs:string"/>
  <attribute name="value" tag="6" type="xs:decimal"/>
<lacbSchema>
```

As already noted, the schema definition namespaces are present with a fixed namespace id in all symbol tables. After the above definition, "http://www.diebold.com/schemas/test" would be added to the symbol table.

In an example embodiment, the ACB-to-LACB Bridge automatically loads and processes schema definitions as messages are sent to the peripherals. This ensures that the peripheral supports a compatible message format.

Security

Sensitive parts of the message can be encrypted by marking tags as such. This can be specified in an XML schema using the "encrypt" attribute from the "lacbTypes" namespace on the element or attribute definition. This is expressed in the LACB schema and thereby reflected in the symbol table. For example, the schema below secures the "inner" element content:

```
<lacbSchema xmlns="http://www.diebold.com/schemas/lacb/schema/v1.0"
    xmlns:xs="http://www.w3.org/2001/XMLSchema"
    targetNamespace="http://www.diebold.com/schemas/test"
    targetNamespaceId="10">
  <element name="top" tag="1"/>
  <element name="inner" tag="2" encrypt="true"/>
  . . .
<lacbSchema>
```

Note that this should be used with compiled-in schemas. Otherwise, the schema itself could be easily compromised to change the security of sensitive tags.

Firmware View

For convenience, LACB messages are expressed using XML syntax and paradigms, but no actual XML exists at the peripheral device level. Internally, all message data is stored in TLV format and data is manipulated in-place wherever possible.

Internally, messages are built in a typical TLV structure, but for abstraction of tag ids, the API looks much like an XML DOM.

As an example, consider the following theoretical cash unit structure:

```
<cashUnitInfo xmlns="http://www.diebold.com/schemas/cashUnit">
  <logicalCU
      name="Cassette1"
      currencyId="USD"
      values="20"
      count="100">
    <physicalCU
        physicalPositionName="BIN1"
        count="25">
      <engiData>.........</engiData>
    </physicalCU>
    <physicalCU
        physicalPositionName="BIN2"
        count="75">
      <engiData>.........</engiData>
    </physicalCU>
```

```
  </logicalCU>
</cashUnitInfo>
```

The following pseudo-code would create the TLV message for the structure above:

```
LACB_MESSAGE *msg = lacbAllocMessage(context);
if (msg)
    LACB_ELEMENT *cashUnitInfo = lacbSetRootElement(msg,
        kTLV_cashUnitInfo);
    for (lcu: [all logical cash units]) {
        int count=lcu->count, value=lcu->value;
        LACB_ELEMENT *logicalCU = lacbAppendElement(msg,
            kTLV_logicalCU, &cashUnitInfo);
        lacbSetAttributeValue(msg,
            &logicalCU, kTLV_name, "Cassette",
            sizeof("Cassette"));
        lacbSetAttributeValue(&msg,
            &logicalCU, kTLV_currencyId, "USD",
            sizeof("USD"));
        lacbSetAttributeValue(&msg,
            &logicalCU, kTLV_values, &value, sizeof(value));
        lacbSetAttributeValue(&msg,
            &logicalCU, kTLV_count, &count, sizeof(count));
        for (pcu: [all physical for logical]) {
            LACB_ELEMENT *physicalCU = lacbAppendElement(&msg,
                kTLV_physicalCU, &logicalCU);
            lacbSetAttributeValue(&msg,
                &physicalCU, kTLV_physicalPositionName, "BIN1",
                sizeof("BIN1"));
            lacbSetAttributeValue(&msg,
                &physicalCU, kTLV_count, &(pcu->count),
                sizeof(pcu->count));
            LACB_ELEMENT *engiData = lacbAppendElement(
                &msg, kTLV_engiData, &physicalCU);
            lacbSetElementValue(&msg,
                &engiData,
                pcu->engiData, pcu->engiDataSize);
        }
    }
}
```

When a schema is processed at build time, a header file is generated with preprocessor defines for element and attribute names. The above example uses these definitions (i.e. kTLV_XXX). For cases where the tag mappings are not present until run-time (such as with the ACB/LACB bridge), the name of elements and attributes may be used with the symbol table. To access values in the structure above by name, the DOM-like interface could be used to get the engineering data for the second physical CU for the first logic CU like this:

```
ENGDATA *engiData = (ENGDATA*)lacbGetElementValue(
    lacbGetChildElement(
        lacbGetChildElement(lacbGetRoot(msg),
            lacbGetTagIdForName(context, nsid, "logicalCU"), 0),
        lacbGetTagIdForName(context, nsid, "physicalCU"),
    1)),
        &engiDataLength);
```

Values returned by APIs are pointers to the actual data within the message TLV so the data should be copied if it is needed once the message is freed.

Using this approach for the module and OSI message interfaces provides the following aspects:

Messages can be more human-readable when expressed in XML vs. raw TLV format.

the XML schema can be used to for validation to enforce message structure and provide default values.

XML technologies such as XSLT can be used to manipulate messages in test tools.

The Genesis ACB can communicate with LACB components without message-specific translation.

With a common messaging infrastructure, services can easily move between the OSI and PC).

Message Routing

The logic of the LACB message routing is the same as that of the ACB with category, type and id. Routing information is incorporated into each message as elements off the root element. Similarly, message registration is also performed via LACB messages. Therefore, like the schema definition namespaces, the namespace used for message routing is present in all symbol tables.

LACB Programming Interface

.NET Components

From within .NET (i.e. C#) components, schemas are sent and messages are translated transparently between the ACB and LACB within the connector based on registration data. The programming interface is, by design, the same as currently used in the Genesis architecture.

C/C++ Components

Unlike the Genesis .NET interface, the C API does not use XML messages at its base. Rather, the API accesses a tree representation of the message similar to a DOM API. In addition, specific components of the message can be access via simple XPath-like expressions.

Support Files

The following support files are generated for each schema by the xsd2lacb utility:

.lacb—contains an LACB schema generated from an XML schema. It can be sent directly to an LACB component over the ACB-LACB Bridge to allow conversion between LACB/TLV and XML.

.h—contains C source code from an LACB schema that can be #include'ed to define an LACB SCHEMA structure and the constants for element and attribute names.

.txt—a human-readable summary of the tag ids and names, useful for debugging

C++ Interface

A C++ wrapper on the C APIs makes message access and creation less "wordy". Wrapper classes mirror the C structures used by the LACB API:

LACBMessage—Wraps an LACB_MESSAGE structure
LACBElement—Wraps an LACB_ELEMENT structure representing an element in the message
LACBAttribute—Wraps an LACB_ELEMENT structure representing an attribute in the message
LACBContext—Wraps an LACB_CONTEXT structure Operator overloads on LACBMessage, LACBElement and LACBAttribute allow message manipulation:

Operator Overloading Conventions:

>>—References a sub-element of a message or element
+=Adds a sub-element to a message (root element) or element
^ References an attribute on an element
^=Adds an attribute to an element
[ ] References the Nth sub-element under an element
=Assigns a value to an attribute or element
( ) Typecast gets the value of an attribute or element
(LACB_ELEMENT*) Typecast to the C structure pointer can be used as a parameter for C functions, as one would expect Using the C++ interface, the cash unit example above could be built as follows:

```
LACBMessage msg(context);
LACBElement cashUnitInfo = (msg += kTLV_cashUnitInfo);
for (lcu: [all logical cash units]) {
   int count=lcu->count, value=lcu->value;
   LACBElement logicalCU = cashUnitInfo += kTLV_logicalCU;
   (logicalCU ^= kTLV_name) = "Cassette";
   (logicalCU ^= kTLV_currencyId) = "USD";
   (logicalCU ^= kTLV_values) = value;
   (logicalCU ^= kTLV_count) = count;
   for (pcu: [all physical for logical]) {
      LACBElement physicalCU = (logicalCU += kTLV_physicalCU);
      (physicalCU ^= kTLV_physicalPositionName) = "BIN1";
      (physicalCU ^= kTLV_count) = count;
      (physicalCU ^= kTLV_engiData).setValue(
         pcu->engiData, pcu->engiDataSize);
   }
}
```

Figure 33:
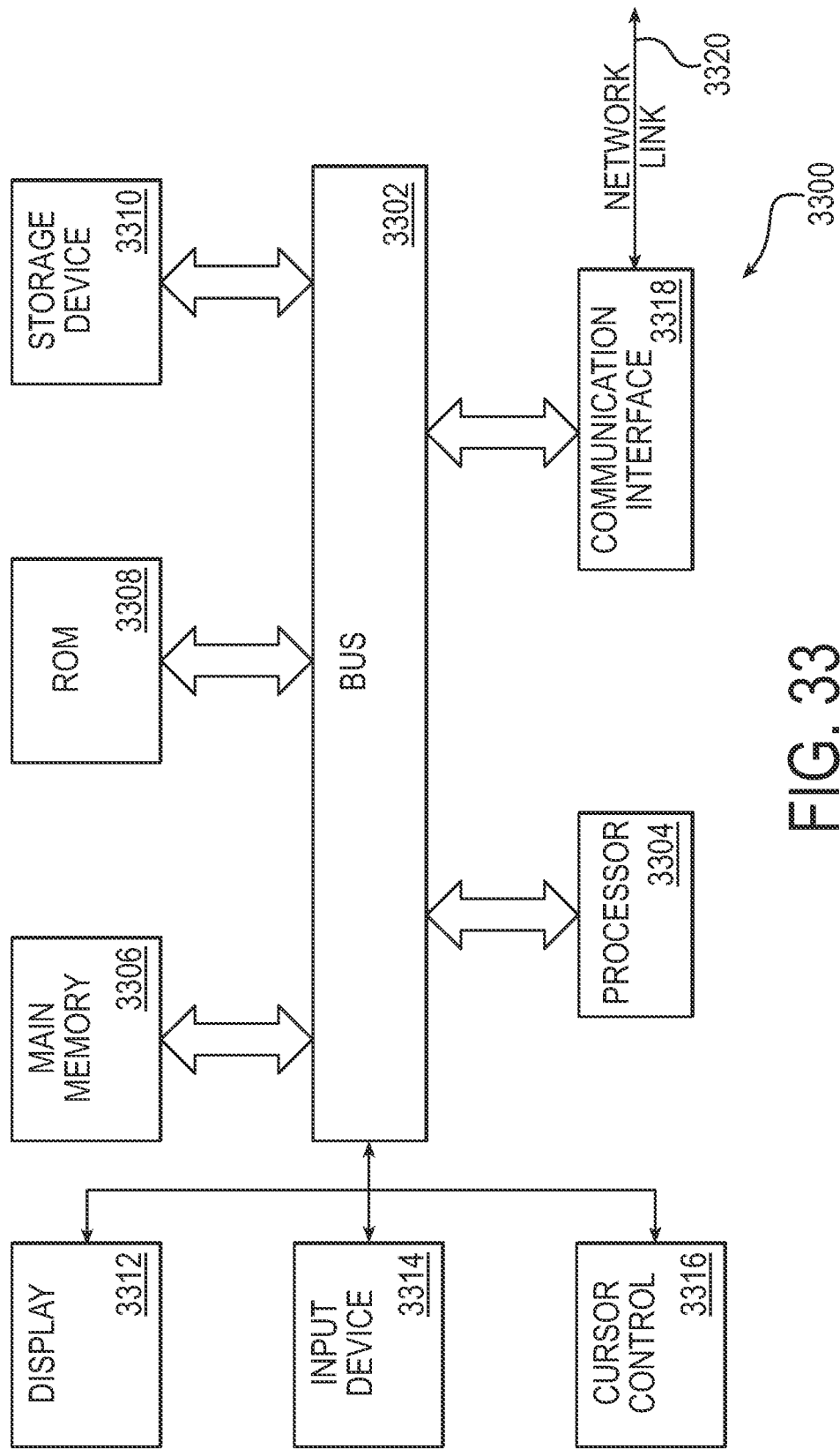
FIG. 33 illustrates a computer system upon which an example embodiment can be implemented.

FIG. 33 illustrates a computer system upon which an example embodiment can be implemented. For example, computer system 3300 may be employed to implement the functionality of controller 114 (FIG. 1), the logic for cassette 502 (FIG. 2), the logic for module processor 504 (FIG. 5), ATM PC 508 (FIG. 5), controller 702 (FIG. 7g, Gate controller 708 (FIG. 7), controller 2510 (FIG. 25), and controller 2816 (FIG. 28). Processor 3304 can be utilized as for processor 3102 (FIG. 32).

Computer system 3300 includes a bus 3302 or other communication mechanism for communicating information and a processor 3304 coupled with bus 3302 for processing information. Computer system 3300 also includes a main memory 3306, such as random access memory (RAM) or other dynamic storage device coupled to bus 3302 for storing information and instructions to be executed by processor 3304. Main memory 3306 also may be used for storing a temporary variable or other intermediate information during execution of instructions to be executed by processor 3304. Computer system 3300 further includes a read only memory (ROM) 3308 or other static storage device coupled to bus 3302 for storing static information and instructions for processor 3304. A storage device 3310, such as a magnetic disk or optical disk, is provided and coupled to bus 3302 for storing information and instructions.

An aspect of the example embodiment is related to the use of computer system 3300 for implementing the example embodiments described herein. According to an example embodiment, implementing the example embodiments described herein is provided by computer system 3300 in response to processor 3304 executing one or more sequences of one or more instructions contained in main memory 3306. Such instructions may be read into main memory 3306 from another computer-readable medium, such as storage device 3310. Execution of the sequence of instructions contained in main memory 3306 causes processor 3304 to perform the process steps described herein. One or more processors in a multi-processing arrangement may also be employed to execute the sequences of instructions contained in main memory 3306. In alternative embodiments, hard-wired circuitry may be used in place of or in combination with software instructions to implement an example embodiment. Thus, embodiments described herein are not limited to any specific combination of hardware circuitry and software.

The term "computer-readable medium" as used herein refers to any medium that participates in providing instructions to processor 3304 for execution. Such a medium may take many forms, including but not limited to non-volatile media. Non-volatile media include for example optical or magnetic disks, such as storage device 3310. Common forms of computer-readable media include for example floppy disk, a flexible disk, hard disk, magnetic cards, paper tape, any other physical medium with patterns of holes, a RAM, a PROM, an EPROM, a FLASHPROM, CD, DVD or any other memory chip or cartridge, or any other medium from which a computer can read.

Computer system 3300 also includes a communication interface 3318 coupled to bus 3302. Communication interface 3318 provides a two-way data communication coupling computer system 3300 to a network link or bus 3320 that is connected to a local network 3322.

For example, communication interface 3318 may be a local area network (LAN) card to provide a data communication connection to a compatible LAN. As another example, communication interface 3318 may be an integrated services digital network (ISDN) card or a modem to provide a data communication connection to a corresponding type of telephone line. Wireless links may also be implemented. In any such implementation, communication interface 3318 sends and receives electrical, electromagnetic, or optical signals that carry digital data streams representing various types of information.

Figure 34:
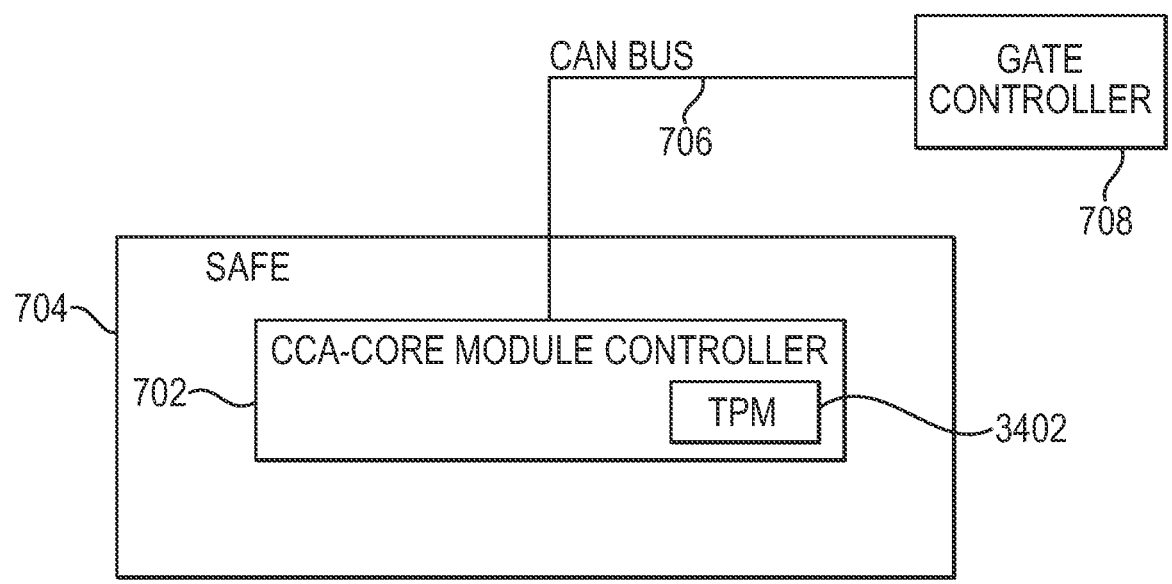
FIG. 34 illustrates an example embodiment of a core module controller employing a trusted platform to bond two controllers communicating over an unsecured bus.

FIG. 34 illustrates an example embodiment of a controller employing a trusted platform module to bond two controllers communicating over an unsecured bus. In an example embodiment, a Rivest-Shamir-Adleman ("RSA") algorithm is employed to bond the core module controller 702 to the gate controller 708. The core module controller 702 may include or be coupled with a Trusted Platform Module ("TPM") 3402. See, for example, U.S. Pat. No. 7,922,080, which is herby incorporated by reference in its entirety. The TPM 3402 can be employed to perform all or portions of the cryptographic functions to establish secure communications between the core module controller 702 and the gate controller 708.

In an example embodiment, establishing encrypted communications may comprise the core computer 702 using the TPM 3402 to encrypt at least one key such as a session key to form encrypted key data. The establishing the encrypted communication may further comprise the core module controller 702 causing the encrypted key data to be communicated from the core module computer 702 to the gate controller 708. In addition, establishing the encrypted communication may comprise the at least gate controller 708 decrypting the at least one key from the encrypted key data.

Figure 35:
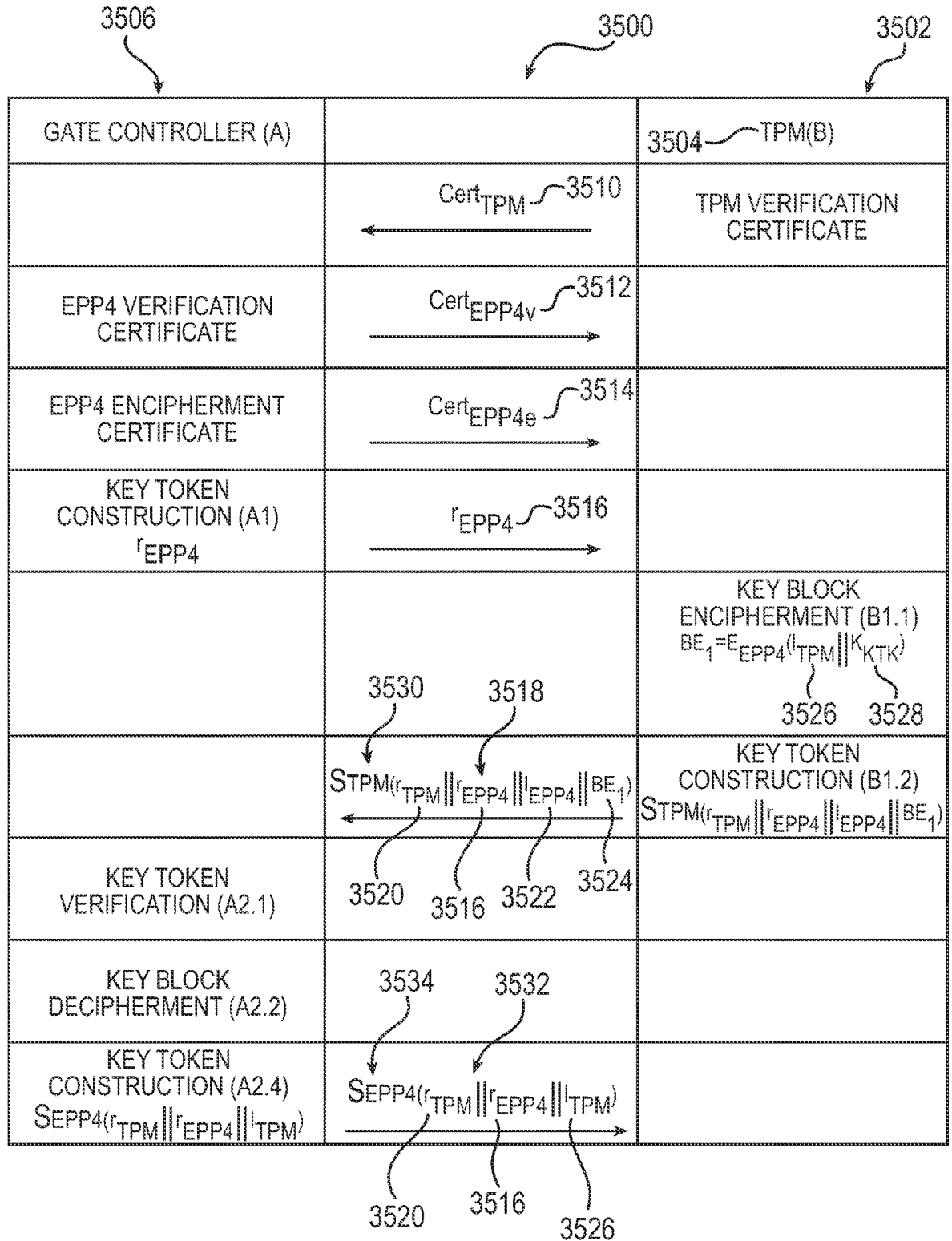
FIG. 35 shows a schematic view of a protocol to bond two controllers communicating over an unsecured bus.

The core module controller 702 and the gate controller 708 are operative to use the key to encrypt and decrypt the operational data sent therebetween. The key may correspond to a symmetrical key usable with cryptographic algorithms such as DES, triple DES, AES, or any other encryption/decryption operation capable of being performed by the computer using the TPM 3402 and the gate controller 708. The core module controller 702 may use the TPM 3402 to securely store the key in either the TPM 3402 or an encrypted file or other location external to the TPM 3402. The gate controller 708 may also store the key in a data store FIG. 35 shows an schematic view of a protocol 3500 being carried out between a gate controller 702, and a TPM 3402. Column 3502 represents messages sent and received by the TPM 3402 and column 3506 represents messages sent and received by the gate controller 708. It is to be understood that in this example embodiment the core controller module 702 uses the TPM 3402 to establish the secure connection with the gate controller 708. As used herein, the term "using the TPM" corresponds to software operating in the computer which causes the computer to access functions of the TPM: for performing cryptographic functions on data such as signing data, for retrieving and/or storing data in a secure manner in the ATM, and/or for performing other TPM operations.

In this example embodiment, the TPM 3402 associated with the core module controller 702 is operative to exchange digital certificates 3510, 3512, 3514 with the gate controller 708. After the exchange, core module controller 702 has access to at least one public key of the gate controller 708, and the gate controller 708 has access to at least one public key of the core module controller 702 and/or TPM. 3402 In this described embodiment, the gate controller 708 and the core module controller 702 and/or TPM 3402 may include more than one digital certificate, each of which are devoted to different operations. For example, the gate controller 708 may include a digital certificate 3512 for use with verifying digital signatures generated by the gate controller 708 and may include a digital certificate 3514 for use with encrypting messages being sent to the gate controller 708. However, in alternative embodiments the gate controller 708 and the core module controller 702 and/or TPM 3402 may include only one digital certificate for use with both encryption and verification operations.

In an example embodiment, the gate controller 708 is operative to generate and communicate a random number 3516 to the core module controller 702. In response, the core module computer 702 is operative to use the TPM 3402 to generate a message 3518 which is signed with the private key of the TPM 3402. The message includes: the random number 3516 of the gate controller 708 and a further random number 120 generated by the core module controller 702 and/or TPM 3402, a distinguishing identifier 3522 associated with the gate controller 708, and a key block 3524 encrypted by the core module controller 702 and/or TPM 3402 using the public key from the encipherment certificate 3514 of the gate controller 708. The key block 3524 may comprise a distinguishing identifier 3526 associated with the core module controller 702 and/or TPM 3402 and the session key 3528. In an example embodiment, the distinguishing identifiers for the gate controller 708 and core module controller 702 and/or TPM 3402 may correspond to serial numbers or other unique numbers or names which can be used to identify the gate controller 708 and core module controller 702 and/or TPM 3402. In an example embodiment, such distinguishing identifiers may be included in the respective digital certificates 3510, 3512, and 3514.

Upon receipt of the message 3518, the gate controller 708 may be operative to: verify the signature of the TPM 3402 for the message 3530 using the public key included in the certificate 3510 of the TPM 3402, verify that the distinguishing identifier 3522 of the gate controller 708 matches corresponding data stored in the gate controller 708, and verify the random number 3516 of the gate controller 708 received in the message 3518 matches the random number originally sent by the gate controller 708. In response to these verifications, the gate controller 708 is operative to decrypt the key block 3524 included in the message 3518 to produce the session key 3528 and the distinguishing identifier 3526 of the core module controller 702 and/or TPM 3402. The processor may also verify that the distinguishing identifier 126 corresponds to the expected identity of the core module controller 702 and/or TPM 3402. Once these verifications have been performed, the gate controller 708 is operative to accept the session key 3528 and store it in a data store of the gate controller 708.

The gate controller 708 is further operative to construct and communicate to the core module controller 702 a further message 3532 which is signed by the gate controller 708 using a private key associated with the public verification key included in its verification certificate 3512. The further message may include the random numbers 3516, 3520 and the distinguishing identifier 3526 associated with the controller 702 and/or TPM 3402.

Upon receipt of the further message 3532, the core module controller 702 is operative to use the TPM 3402 to verify the signature 3534 of the gate controller 708 using the public verification key included in the verification certificate 3512 of the gate controller 708. In addition the core module controller 702 may be operative to verify that the random numbers 3516, 3520 match the random numbers sent in the message 3518. Also, the core module controller 702 may be operative to verify that the distinguishing identifier 3526 matches the corresponding identify information associated with the core module controller 702 and/or TPM 3402. Once these verifications have been performed, the core module controller 702 is operative to begin using the session key 3528 to encrypt and decrypt information sent to and from the gate controller 708.

As those skilled in the art can readily appreciate, the above-described method and system for establishing a secure communication session between the core module controller 702 and the gate controller 708 may be performed with any other hardware devices. Thus, the principles described herein should not be construed as limited to a core module processor and gate controller as described herein.

In an example embodiment, the core module controller 702 may be operative to send operational messages such as command messages encrypted with the session key to the gate controller 708, which messages cause the gate controller 708 to perform an operation. For example, the gate controller 708 may be responsive to open a gate (not shown, see e.g. FIG. 1) to enable dispensing of cash in a cash withdrawal transaction.

Described above are example embodiments. It is, of course, not possible to describe every conceivable combination of components or methodologies for purposes of describing the example embodiments, but one of ordinary skill in the art will recognize that many further combinations and permutations of the example embodiments are possible. Accordingly, it is intended to embrace all such alterations, modifications and variations that fall within the spirit and scope of any claims filed in applications claiming priority hereto interpreted in accordance with the breadth to which they are fairly, legally and equitably entitled.

The invention claimed is:

1. An apparatus, comprising:
logic encoded in a tangible, non-transitory computer readable medium for execution by at least one processor, and when executed operable to:
obtain data formatted in an Extensible Markup Language ("XML") format;
employ a Tag Length Value ("TLV") message format having a TLV Tag field, a TLV length field, and a TLV value field to represent the XML formatted data in a TLV formatted message, and further operable to:
store data associated with XML data into a TLV value field of the TLV message format, and
assign a plurality of upper bits of the TLV tag field to reflect attributes of the data stored in the TLV value field, the plurality of upper bits comprise a first bit that indicates whether the data stored in the value field is one of a group consisting of an element and an attribute, and a second bit to indicate whether an element is one of a group consisting of a complex element and a simple element;
whereby the TLV formatted message is self-decoding, decodable without a lookup of the symbol table; and
a controller comprises logic operable to cause the data in TLV message format to be sent to a peripheral.

2. The apparatus set forth in claim 1, wherein there is a one to one correspondence between the symbol table and an XML namespace.

3. The apparatus set forth in claim 1, wherein the logic is operable to employ a third bit in the TLV tag field to indicate whether the data stored in the TLV value field is encrypted.

4. The apparatus set forth in claim 1, wherein the logic is operable to employ a third bit in the TLV tag field to indicate how a value is stored.

5. The apparatus set forth in claim 1 wherein when the length of the message is four bytes, the logic is further operable to employ a third bit to indicate that the length of the TLV message is four bytes and further operable to eliminate a length value from the TLV message, wherein the TLV value field immediately follows the TLV tag field.

6. The apparatus set forth in claim 1, the tag field further comprises data representative of a namespace.

* * * * *